United States Patent
Ljungberg et al.

(10) Patent No.: US 12,415,330 B2
(45) Date of Patent: Sep. 16, 2025

(54) FORMING MOULD SYSTEM AND A METHOD FOR FORMING A CELLULOSE PRODUCT IN A FORMING MOULD SYSTEM

(71) Applicant: PulPac AB, Västra Frölunda (SE)

(72) Inventors: Martin Ljungberg, Gothenburg (SE); Björn Arlerot, Gothenburg (SE)

(73) Assignee: PulPac AB, Västra Frölunda (SE)

( * ) Notice: Subject to any disclaimer, the term of this patent is extended or adjusted under 35 U.S.C. 154(b) by 163 days.

(21) Appl. No.: 17/795,795

(22) PCT Filed: Feb. 2, 2021

(86) PCT No.: PCT/EP2021/052361
§ 371 (c)(1),
(2) Date: Jul. 27, 2022

(87) PCT Pub. No.: WO2021/156222
PCT Pub. Date: Aug. 12, 2021

(65) Prior Publication Data
US 2023/0356494 A1 Nov. 9, 2023

(30) Foreign Application Priority Data
Jul. 2, 2020 (SE) .................................... 2050134-2

(51) Int. Cl.
*B29C 33/22* (2006.01)
*B29C 43/00* (2006.01)
(Continued)

(52) U.S. Cl.
CPC ................ *B31D 5/02* (2013.01); *B29C 33/22* (2013.01); *B29C 43/003* (2013.01); *B29C 43/10* (2013.01);
(Continued)

(58) Field of Classification Search
CPC ......... B31F 1/0077; B29C 33/42; B31D 5/02; B31B 50/592
See application file for complete search history.

(56) References Cited

U.S. PATENT DOCUMENTS 5,221,248 A * 6/1993 Weder .................... B65D 85/52
493/170
2007/0042887 A1 2/2007 Johns et al.
(Continued)

FOREIGN PATENT DOCUMENTS

CN 1285780 A 2/2001
CN 1352596 A 6/2002
(Continued)

OTHER PUBLICATIONS

Search Report and Written Opinion for International Patent Application No. PCT/EP2021/052361, mailed May 3, 2021.
(Continued)

*Primary Examiner* — Christopher T Schatz
(74) *Attorney, Agent, or Firm* — Sage Patent Group

(57) ABSTRACT

A forming mould system (3) for forming a cellulose product (1) from an air-formed cellulose blank structure (2), where the forming mould system (3) comprises a first mould part (4a) and a second mould part (4b). The first mould part (4a) and the second mould part (4b) are configured for moving in relation to each other in a pressing direction (DP). The second mould part (4b) comprises a forming cavity section (5) and an inlet section (6), where the inlet section (6) is arranged in connection to the forming cavity section (5) and configured for facilitating displacement of the cellulose blank structure (2) into a forming cavity (5a) of the forming cavity section (5). The inlet section (6) comprises a transition surface (6a) defining an inlet opening (6b), and the inlet opening (6b) is having a tapered configuration towards the forming cavity (5a). The disclosure further relates to a
(Continued)

method for forming a cellulose product (1) from an air-formed cellulose blank structure (2) in a forming mould system (3).

14 Claims, 16 Drawing Sheets

(51) Int. Cl.
  *B29C 43/10* (2006.01)
  *B29C 43/36* (2006.01)
  *B29C 43/52* (2006.01)
  *B31D 5/02* (2017.01)
  *B31F 1/00* (2006.01)
  *D21J 3/00* (2006.01)
  *B29K 1/00* (2006.01)
  *B29K 105/04* (2006.01)
  *B31B 50/59* (2017.01)
(52) U.S. Cl.
  CPC .............. *B29C 43/36* (2013.01); *B29C 43/52* (2013.01); *B31F 1/0077* (2013.01); *D21J 3/00* (2013.01); *B29K 2001/00* (2013.01); *B29K 2105/04* (2013.01); *B31B 50/592* (2018.05)

(56) References Cited

U.S. PATENT DOCUMENTS

| | | | |
|---|---|---|---|
| 2008/0242525 A9* | 10/2008 | Johns | B31B 70/00 493/143 |
| 2019/0070819 A1* | 3/2019 | Larsson | B29C 51/002 |

FOREIGN PATENT DOCUMENTS

| | | |
|---|---|---|
| CN | 1403349 A | 3/2003 |
| DE | 102015105099 A1 | 10/2016 |
| EP | 0951990 A2 | 10/1999 |
| KR | 20110024366 A | 3/2011 |
| SE | 1750313 A1 | 9/2018 |
| WO | WO-2019209160 A1 | 10/2019 |

OTHER PUBLICATIONS

Office Action mailed Mar. 21, 2025 for Chinese Patent Application No. 202180026596.0, 11 pages.

* cited by examiner

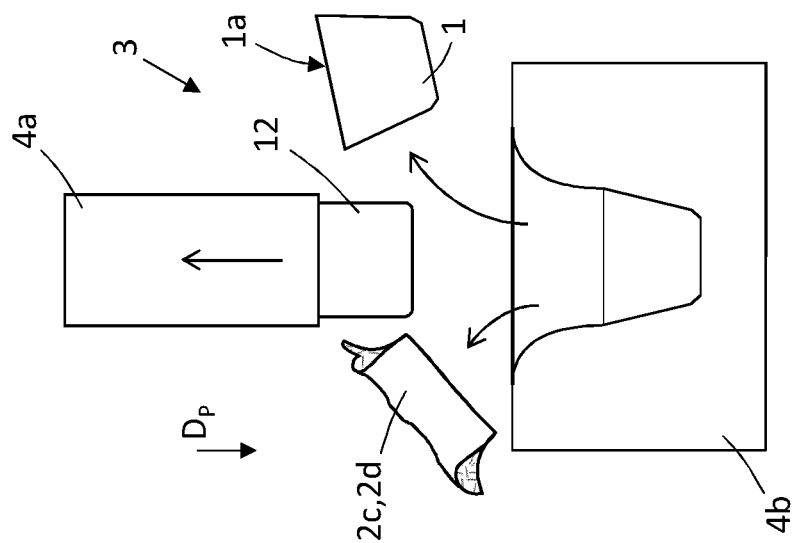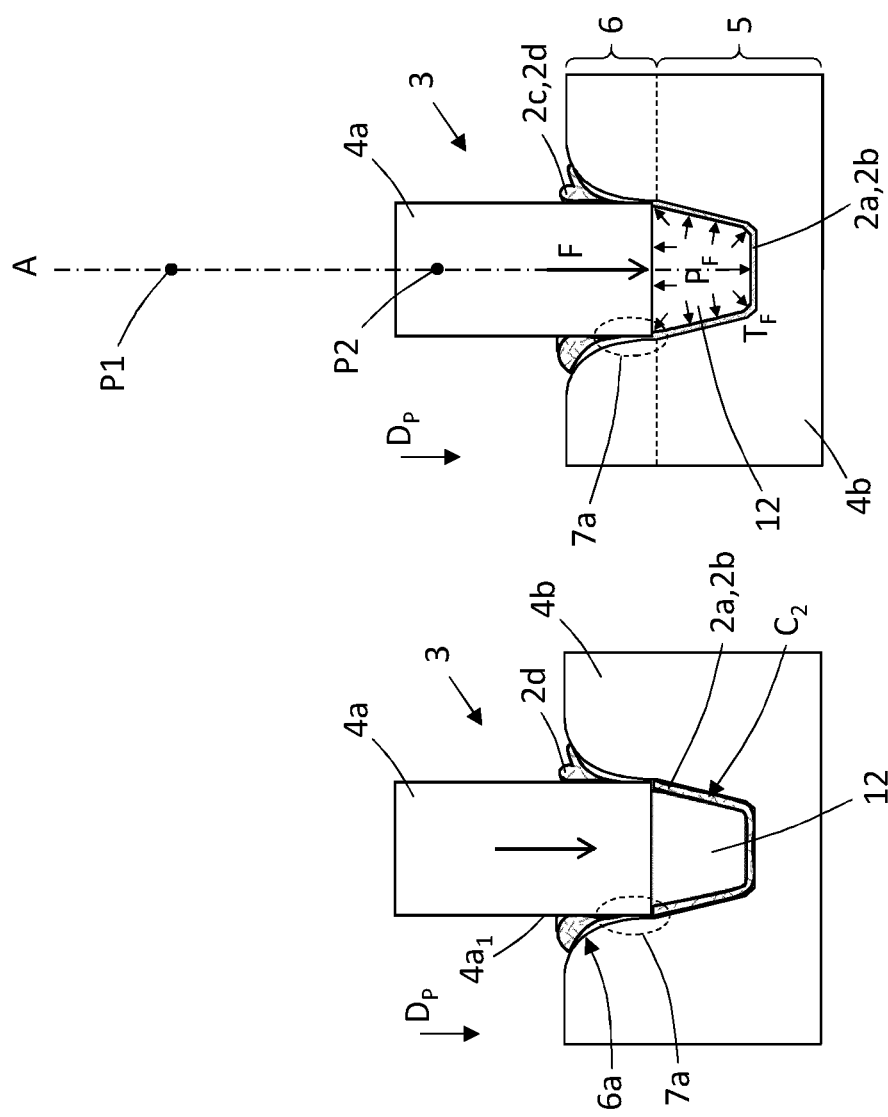
Fig. 3f
Fig. 3e
Fig. 3d

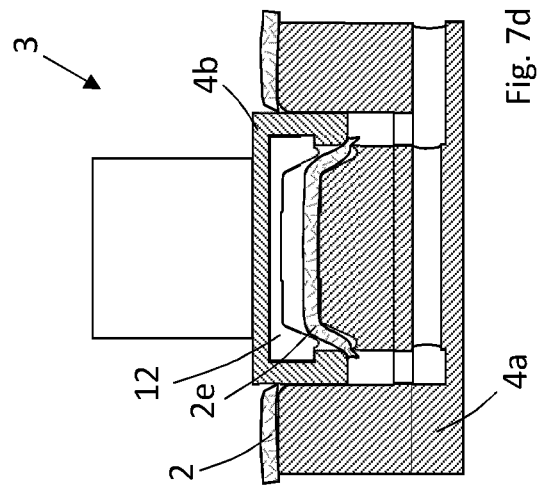
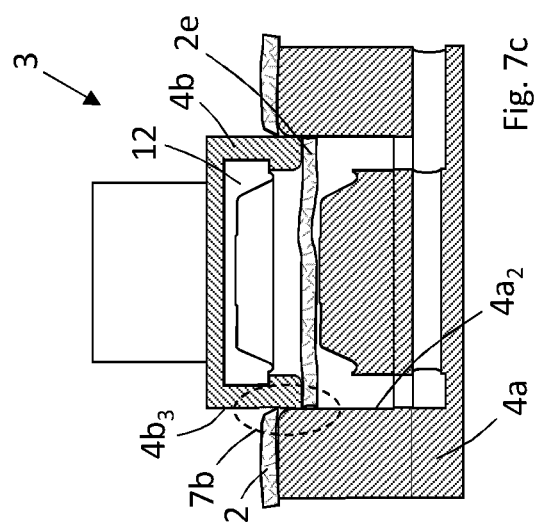
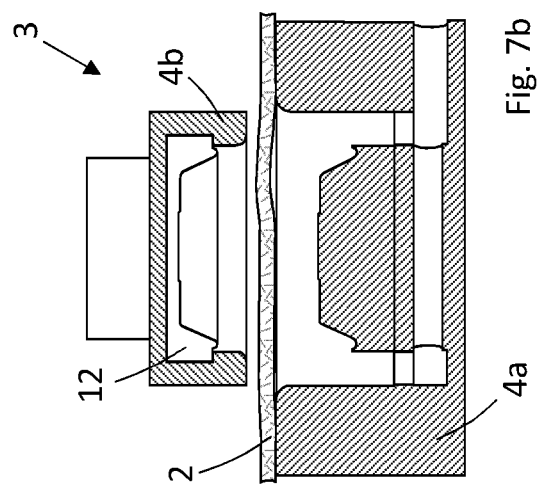

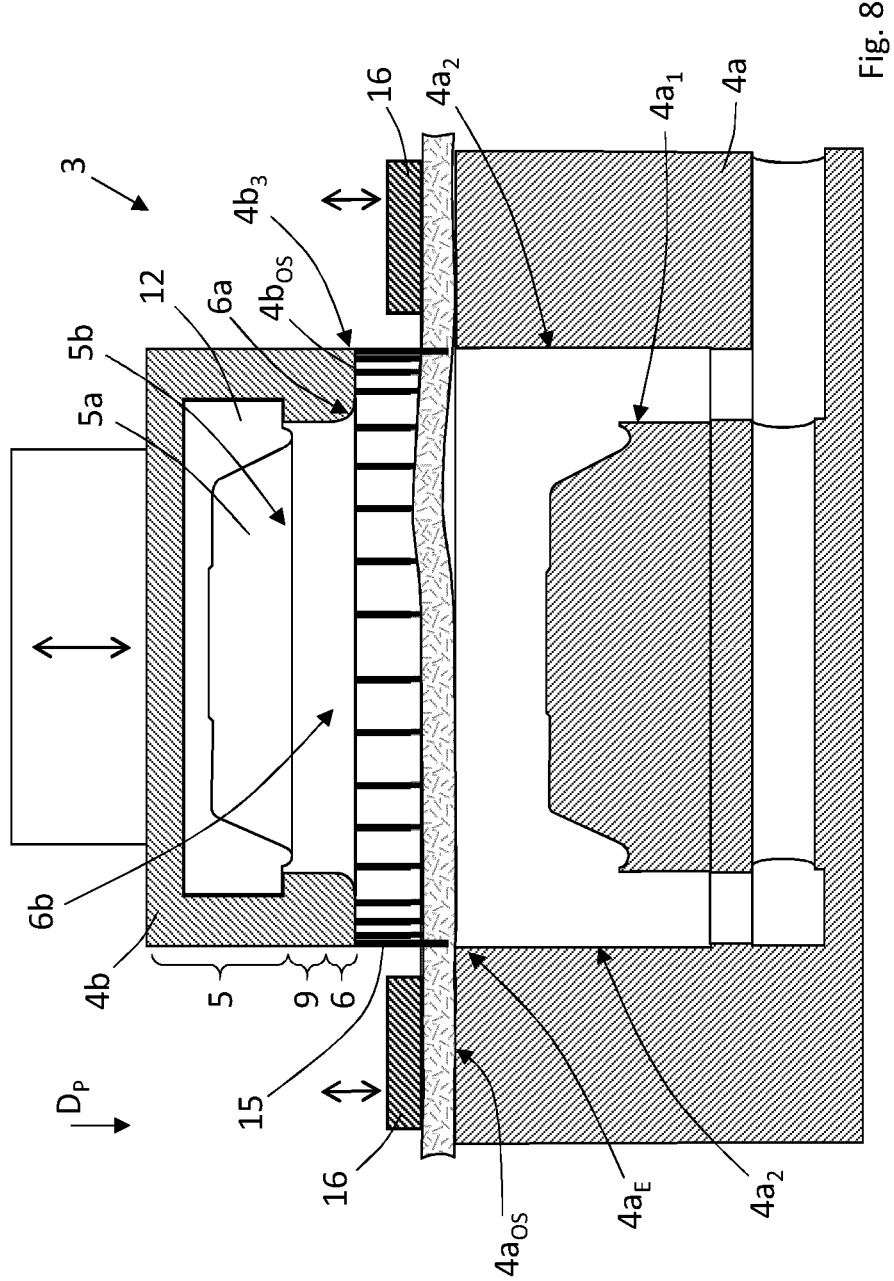

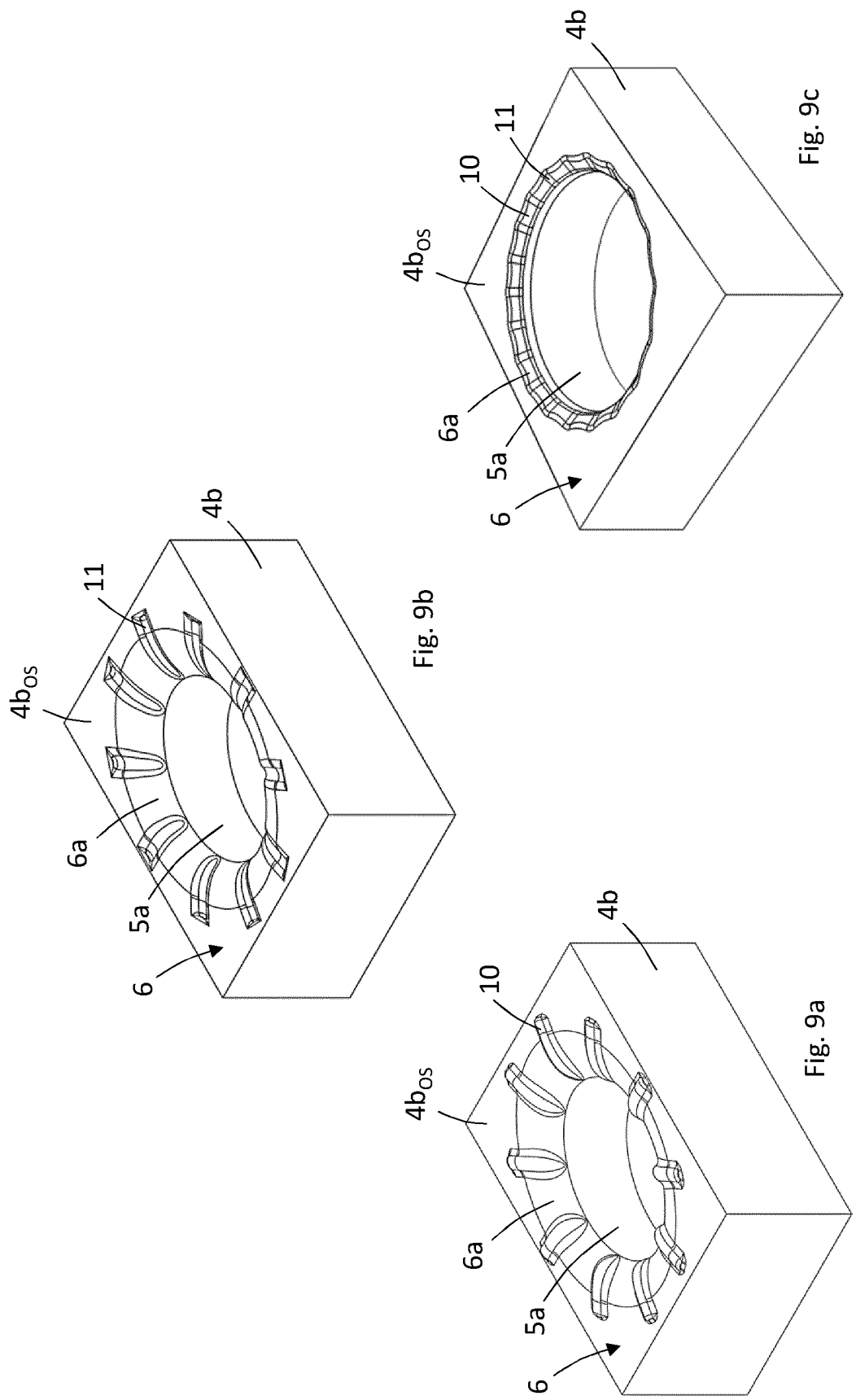

FORMING MOULD SYSTEM AND A METHOD FOR FORMING A CELLULOSE PRODUCT IN A FORMING MOULD SYSTEM

TECHNICAL FIELD

The present disclosure relates to a forming mould system for forming a cellulose product from an air-formed cellulose blank structure. The forming mould system comprises a first mould part and a second mould part, where the first mould part and the second mould part are configured for moving in relation to each other in a pressing direction. The disclosure further relates to a method for forming a cellulose product from an air-formed cellulose blank structure in a forming mould system.

BACKGROUND

Cellulose fibres are often used as raw material for producing or manufacturing products. Products formed of cellulose fibres can be used in many different situations where there is a need for having sustainable products. A wide range of products can be produced from cellulose fibres and a few examples are disposable plates and cups, cutlery, lids, bottle caps, coffee pods, blank structures, and packaging materials.

Forming mould systems are commonly used when manufacturing cellulose products from raw materials including cellulose fibres, and traditionally the cellulose products have been produced with wet-forming techniques. A material commonly used for cellulose fibre products is wet moulded pulp. Wet moulded pulp has the advantage of being considered as a sustainable packaging material, since it is produced from biomaterials and can be recycled after use. Consequently, wet moulded pulp has been quickly increasing in popularity for different applications. Wet moulded pulp articles are generally formed by immersing a suction forming mould into a liquid or semi liquid pulp suspension or slurry comprising cellulose fibres, and when suction is applied, a body of pulp is formed with the shape of the desired product by fibre deposition onto the forming mould. With all wet-forming techniques, there is a need for drying of the wet moulded product, where the drying is a very time and energy consuming part of the production. The demands on aesthetical, chemical and mechanical properties of cellulose products are increasing, and due to the properties of wet-formed cellulose products, the mechanical strength, flexibility, freedom in material thickness, and chemical properties are limited. It is also difficult in wet-forming processes to control the mechanical properties of the products with high precision.

One development in the field of producing cellulose products is the forming of cellulose fibres without using wet-forming techniques. Instead of forming the cellulose products from a liquid or semi liquid pulp suspension or slurry, an air-formed cellulose blank structure is used. The air-formed cellulose blank structure is inserted into a forming mould and during the forming of the cellulose products the cellulose blank is subjected to a high forming pressure and a high forming temperature. When inserting the cellulose blank structure into the forming mould, there is a risk that the cellulose blank structure breaks apart in an undesired manner, which leads to an improper forming of the cellulose products. This is a common issue with traditional cellulose high pressure forming moulds, especially for deep-drawn products, leading to products with low quality. Other problem with traditional forming moulds, especially when forming deep-drawn products, are that that cracks, fibre separations, material fractures, or other unwanted structural weakenings of the cellulose blank structure are formed during the insertion into the forming mould.

There is thus a need for an improved forming mould system and method for forming cellulose products from an air-formed cellulose blank structure.

SUMMARY

An object of the present disclosure is to provide a forming mould system for forming a cellulose product from an air-formed cellulose blank structure, and a method for forming a cellulose product from an air-formed cellulose blank structure in a forming mould system, where the previously mentioned problems are avoided. This object is at least partly achieved by the features of the independent claims. The dependent claims contain further developments of the forming mould system for forming a cellulose product from an air-formed cellulose blank structure, and the method for forming a cellulose product from an air-formed cellulose blank structure in a forming mould system.

The disclosure concerns a forming mould system for forming a cellulose product from an air-formed cellulose blank structure. The forming mould system comprises a first mould part and a second mould part, where the first mould part and the second mould part are configured for moving in relation to each other in a pressing direction. The second mould part comprises a forming cavity section and an inlet section, where the inlet section is arranged in connection to the forming cavity section and configured for facilitating displacement of the cellulose blank structure into a forming cavity of the forming cavity section. The inlet section comprises a transition surface defining an inlet opening, where the inlet opening is having a tapered configuration towards the forming cavity.

Advantages with these features are that the inlet opening with the tapered configuration defined by the transition surface is facilitating the transport or displacement of the cellulose blank structure into the forming cavity. The cellulose blank structure is a fluffy structure that easily breaks when being handled, and the traditional forming moulds used in combination with such fluffy cellulose structures are often creating problems during the forming process. When inserting the cellulose blank structure into the forming mould, there is a risk that the cellulose blank structure breaks apart in an undesired manner, which leads to an improper forming of the cellulose products. With the tapered configuration of the inlet opening according to the disclosure, these problems are avoided, also for deep-drawn products. With the inlet opening, products with high quality and product finish can be produced in the forming mould system. The tapered configuration is preventing formation of cracks, fibre separations, material fractures, or other unwanted structural weakenings, when the cellulose blank structure is displaced into the forming mould. The system also enables the production of deep-drawn products that upon completion lack a surface extending outwards from the sides of the deep-drawn product in a direction essentially perpendicular to the pressing direction or in a direction essentially normal or perpendicular to the sides of the deep-drawn product. Such surfaces, which can be likened to a brim of a hat, can thus be avoided for cellulose products where this is not desired. For a cellulose product, unlike metallic deep-drawn products, such a surface cannot easily be removed by for example grinding or cutting, after the forming of the deep-drawn cellulose product due to the material properties of the cellulose product.

According to an aspect of the disclosure, the transition surface is extending from an outer mould section of the second mould part towards a cavity inlet opening of the forming cavity.

According to another aspect of the disclosure, a first wall surface section of the first mould part and the transition surface are forming an inner tearing arrangement. The inner tearing arrangement is configured for at least partly separating a cellulose blank structure part from the cellulose blank structure between the first wall surface section and the transition surface. Through the separation of the cellulose blank structure part from the cellulose blank structure, the transportation of the cellulose blank structure into the forming cavity is simplified. The cellulose blank structure may be a too large structure for an efficient forming of cellulose products with high quality, and the separation is providing a smaller and more formable structure.

According to an aspect of the disclosure, the first mould part comprises a second wall surface section arranged outwardly of the first wall surface section. The second mould part comprises a third wall surface section arranged outwardly of the inlet opening. The second wall surface section and the third wall surface section are forming an outer tearing arrangement, and the outer tearing arrangement is configured for pre-separating the cellulose blank structure between the second wall surface section and the third wall surface section. Through the pre-separation of the cellulose blank structure, the transportation of the cellulose blank structure into the forming cavity is even further simplified. The cellulose blank structure is configured into a pre-separated smaller structure suitable for a further separation step of the inner tearing arrangement. This two-step separation process is efficiently forming cellulose products with high quality, and the pre-separation is providing a smaller and more formable cellulose blank structure.

According to another aspect of the disclosure, the transition surface has a curved tapered configuration. The curved tapered configuration is providing a smooth transition shape of the transition surface for an efficient and controlled displacement of the cellulose blank structure.

According to further aspects of the disclosure, the transition surface comprises a first surface section extending from the outer mould section in a direction towards the forming cavity, and a second surface section extending from the first surface section in a direction towards the forming cavity. The first surface section has a curved tapered configuration, and the second surface section has a curved tapered configuration or a frustoconical-like tapered configuration. The configuration with two surface sections having the described shapes is providing an alternative efficient and controlled displacement of the cellulose blank structure.

According to an aspect of the disclosure, the second mould part further comprises an edge forming section configured for pre-shaping the cellulose blank structure part and forming an edge of the cellulose product. The edge forming section is arranged between the inlet section and the forming cavity section. The edge of the cellulose product is being formed when the cellulose fibres of the cellulose blank structure part are compacted and pushed into the forming cavity. The fibres arranged at the upper section of the cellulose blank structure part are being compressed and shaped into the edge when the cellulose blank structure part is displaced into the forming cavity. The compression and the transportation of fibres in the pressing direction is supporting the formation of a compact and well-defined edge during the displacement of the cellulose blank structure part. The edge forming section may further be used for securing a complete, or essentially complete, separation of the cellulose blank structure part from the cellulose blank structure.

According to another aspect of the disclosure, the edge forming section comprises a wall surface. The wall surface is connecting the inlet section and the forming cavity section, and the wall surface is extending in the pressing direction, or essentially in the pressing direction, between the inlet section and the forming cavity section. The extension in the pressing direction is used for efficiently separating the cellulose blank structure part from the cellulose blank body. The wall surface is arranged parallel to, or essentially parallel to, the pressing direction. The extension of the wall surface, and thus the edge forming section, in the pressing direction may vary depending on the design of the forming mould system.

According to a further aspect of the disclosure, the inlet section comprises one or more protrusions extending from the outer mould section towards the forming cavity and/or one or more grooves extending from the outer mould section towards the forming cavity. The one or more protrusions and/or the one or more grooves are configured for controlling the displacement of the cellulose blank structure into the forming cavity. The one or more protrusions and/or the one or more grooves are supporting a controlled displacement into the forming cavity.

According to an aspect of the disclosure, the inlet section is arranged as an integrated structure of the second mould part. With such a configuration, the second mould part can be made from a single piece of material with high strength and finish.

According to another aspect of the disclosure, the first mould part and/or the second mould part comprises a deformation element. The deformation element is configured for exerting a forming pressure on the cellulose blank structure in the forming cavity. The deformation element is providing an efficient forming of the cellulose product, especially if having complex shapes or structural reinforcements.

According to a further aspect of the disclosure, the forming pressure is in the range 1-100 MPa, preferably 4-20 MPa. Forming of the cellulose products within the pressure range is securing an efficient fibril aggregation through hydrogen bonds of the cellulose fibres in the cellulose blank structure.

According to an aspect of the disclosure, the forming pressure is an isostatic forming pressure. The isostatic forming pressure is providing an efficient forming of cellulose products having complex shapes.

According to another aspect of the disclosure, a side wall section of the deformation element and the transition surface are forming a compacting arrangement. The compacting arrangement is configured for compacting the cellulose blank structure between the side wall section and the transition surface. The compacting arrangement is securing an efficient transportation of the cellulose blank structure into the forming cavity, where a nip or gap with decreasing size in the pressing direction is formed between the side wall section and the transition surface during movement of the first mould part and/or the second mould part in the pressing direction.

The disclosure further concerns a method for forming a cellulose product from an air-formed cellulose blank structure in a forming mould system. The forming mould system comprises a first mould part and a second mould part, and the first mould part and the second mould part are movably arranged in relation to each other in a pressing direction. The second mould part comprises a forming cavity section and an inlet section. The inlet section is arranged in connection to the forming cavity section and configured for facilitating displacement of the cellulose blank structure into a forming cavity of the forming cavity section. The inlet section comprises a transition surface defining an inlet opening, where the inlet opening is having a tapered configuration towards the forming cavity. The method comprises the steps: providing the air-formed cellulose blank structure and feeding the cellulose blank structure to the forming mould system; arranging the cellulose blank structure in connection to the inlet section in a first configuration in a position between the first mould part and the second mould part; moving the first mould part and/or the second mould part in the pressing direction, and displacing the cellulose blank structure into the forming cavity with the first mould part, and during the displacement of the cellulose blank structure controlling a shaping of the cellulose blank structure with the transition surface from the first configuration into a second configuration, wherein the cellulose blank structure in the second configuration is shaped into a three-dimensional cellulose blank body; forming the cellulose product by heating the three-dimensional cellulose blank body to a forming temperature and pressing the three-dimensional cellulose blank body in the forming cavity between the first mould part and the second mould part with a forming pressure.

Advantages with the method are that the tapered configuration defined by the transition surface is facilitating the transport or displacement of the cellulose blank structure into the forming cavity through the inlet opening. The cellulose blank structure is a fluffy structure that easily breaks when being handled, and the transition surface is preventing that the cellulose blank structure breaks apart in an undesired manner, which leads to the forming of cellulose products with high quality, also for deep-drawn products. With the inlet opening, products with high finish can be produced in the forming mould system. The tapered configuration is further preventing formation of cracks, fibre separations, material fractures, or other unwanted structural weakenings during displacement of the cellulose blank structure into the forming mould. As for the system, the method also enables the production of deep-drawn products that upon completion lack a surface extending outwards from the sides of the deep-drawn product in a direction essentially perpendicular to the pressing direction or in a direction essentially normal or perpendicular to the sides of the deep-drawn product. Such surfaces, which can be likened to a brim of a hat, can thus be avoided for cellulose products where this is not desired. For a cellulose product, unlike metallic deep-drawn products, such a surface cannot easily be removed by for example grinding or cutting, after the forming of the deep-drawn cellulose product due to the material properties of the cellulose product.

According to an aspect of the disclosure, a first wall surface section of the first mould part and the transition surface are forming an inner tearing arrangement. The method comprises the step: at least partly tearing the cellulose blank structure with the inner tearing arrangement between the first wall surface section and the transition surface during movement of the first mould part and/or the second mould part in the pressing direction. Through the separation of the cellulose blank structure part from the cellulose blank structure, the transportation of the cellulose blank structure into the forming cavity is simplified. The cellulose blank structure may be a too large structure for an efficient forming of cellulose products with high quality, and the separation is providing a smaller and more formable structure.

According to another aspect of the disclosure, the method comprises the steps: at least partly separating a cellulose blank structure part from the cellulose blank structure during the tearing of the cellulose blank structure, wherein the at least partly separated cellulose blank structure part is forming the three-dimensional cellulose blank body in the second configuration. Through the separation of the cellulose blank structure part from the cellulose blank structure, the transformation into the cellulose blank body is simplified. The cellulose blank structure may be a too large structure for an efficient forming of cellulose products with high quality, and the separation is providing a smaller and more formable structure.

According to a further aspect of the disclosure, the first mould part comprises a second wall surface section arranged outwardly of the first wall surface section. The second mould part comprises a third wall surface section arranged outwardly of the inlet opening. The second wall surface section and the third wall surface section are forming an outer tearing arrangement. The method comprises the step: pre-separating the cellulose blank structure with the outer tearing arrangement between second wall surface section and the third wall surface section during movement of the first mould part and/or the second mould part in the pressing direction, before at least partly tearing the cellulose blank structure with the inner tearing arrangement. With the pre-separation of the cellulose blank structure, the transportation of the cellulose blank structure into the forming cavity is even further simplified. The cellulose blank structure is separated into a smaller structure suitable for a further separation step of the inner tearing arrangement. This two-step separation process is efficiently forming cellulose products with high quality, and the pre-separation is providing a smaller and more formable cellulose blank structure.

According to an aspect of the disclosure, the first configuration of the cellulose blank structure is a flat shape, or essentially flat shape. The flat or essentially flat shape is suitable when arranging the cellulose blank structure between the first mould part and the second mould part for an efficient forming process.

According to another aspect of the disclosure, the method comprises the step: shaping the three-dimensional cellulose blank body into a pleated three-dimensional configuration in the second configuration. The pleated configuration is securing an efficient forming of the cellulose products in the forming cavity. The pleating is preventing cracking or breakage of the cellulose blank structure when being formed into the cellulose product.

According to a further aspect of the disclosure, the method comprises the step: compressing the cellulose blank structure during displacement of the cellulose blank structure from the first configuration into the second configuration. The compression is providing a pre-forming or pre-shaping of the cellulose blank structure to improve the forming of the cellulose products. A compressed cellulose blank structure is easier to handle compared to a non-compressed structure and is securing a better forming result in the forming cavity when applying the forming temperature and the forming pressure.

According to an aspect of the disclosure, the first mould part and/or the second mould part comprises a deformation element. The method comprises the step: exerting the forming pressure on the three-dimensional cellulose blank body in the forming cavity with the deformation element during forming of the cellulose product. The deformation element is providing an efficient forming of the cellulose product, especially if having complex shapes or structural reinforcements.

According to another aspect of the disclosure, a side wall section of the deformation element and the transition surface are forming a compacting arrangement. The method comprises the step: compacting the cellulose blank structure with the compacting arrangement between the side wall section and the transition surface during movement of the first mould part and/or the second mould part in the pressing direction. The compacting arrangement is with the method securing an efficient transportation of the cellulose blank structure into the forming cavity, where a nip with decreasing size in the pressing direction is formed between the side wall section and the transition surface during movement of the first mould part and/or the second mould part in the pressing direction.

According to a further aspect of the disclosure, the method comprises the step: arranging the forming mould system with a friction between the deformation element and the cellulose blank structure that is higher than the friction between the transition surface and the cellulose blank structure. The higher friction between the deformation element and the cellulose blank structure is supporting the displacement of the cellulose blank structure into the forming cavity and the shaping of the cellulose blank structure from the first configuration into the second configuration. With the higher friction between the deformation element and the cellulose blank structure a more reliable and efficient displacement of the cellulose blank structure is achieved, where the deformation element is efficiently catching the cellulose blank structure. When the cellulose blank structure is displaced, the lower friction between the transition surface and the cellulose blank structure secures that the cellulose blank structure easily can slide along the transition surface into the forming cavity.

According to an aspect of the disclosure, the forming pressure is in the range 1-100 MPa, preferably 4-20 MPa, and the forming temperature is in the range 100-300° C. Forming of the cellulose products within the pressure and temperature ranges are securing an efficient fibril aggregation through hydrogen bonds of the cellulose fibres in the cellulose blank structure.

According to another aspect of the disclosure, the forming pressure is an isostatic forming pressure. The isostatic forming pressure is providing an efficient forming of cellulose products having complex shapes, where the pressure distribution in the forming mould during the forming of the cellulose product is equal in all directions.

According to one aspect of the disclosure, the step:
at least partly tearing the cellulose blank structure with the inner tearing arrangement between the first wall surface section and the transition surface during movement of the first mould part and/or the second mould part in the pressing direction, takes place before the step:
forming the cellulose product by heating the three-dimensional cellulose blank body to a forming temperature and pressing the three-dimensional cellulose blank body in the forming cavity between the first mould part and the second mould part with a forming pressure.

According to a further aspect of the disclosure, the step:
at least partly separating a cellulose blank structure part from the cellulose blank structure during the tearing of the cellulose blank structure, takes place before the step:
forming the cellulose product by heating the three-dimensional cellulose blank body to a forming temperature and pressing the three-dimensional cellulose blank body in the forming cavity between the first mould part and the second mould part with a forming pressure.

According to another aspect of the disclosure, the step:
pre-separating the cellulose blank structure with the outer tearing arrangement between second wall surface section and the third wall surface section during movement of the first mould part and/or the second mould part in the pressing direction, before at least partly tearing the cellulose blank structure with the first tearing arrangement, takes place before the step:
forming the cellulose product by heating the three-dimensional cellulose blank body to a forming temperature and pressing the three-dimensional cellulose blank body in the forming cavity between the first mould part and the second mould part with a forming pressure.

By performing the step where separation, at least part separation or pre-separation of the cellulose blank structure takes place before the forming pressing is applied to provide the cellulose product, a cellulose product with sides having a smooth surface structure with no edges extending in a direction essentially perpendicular to the pressing direction can be obtained.

BRIEF DESCRIPTION OF DRAWINGS

The disclosure will be described in detail in the following, with reference to the attached drawings, in which FIG. 3a-f show schematically, in cross-sectional views, the forming mould system in different forming positions according to the disclosure, FIG. 7a-g show schematically, in cross-sectional views, a forming mould system in different forming positions according to another embodiment of the disclosure, FIG. 8 shows schematically, in a cross-sectional view, a forming mould system according to another embodiment of the disclosure, and FIG. 9a-c show schematically, in perspective views, a mould part of the forming mould system according to other embodiments of the disclosure.

DESCRIPTION OF EXAMPLE EMBODIMENTS

Figure 1A:
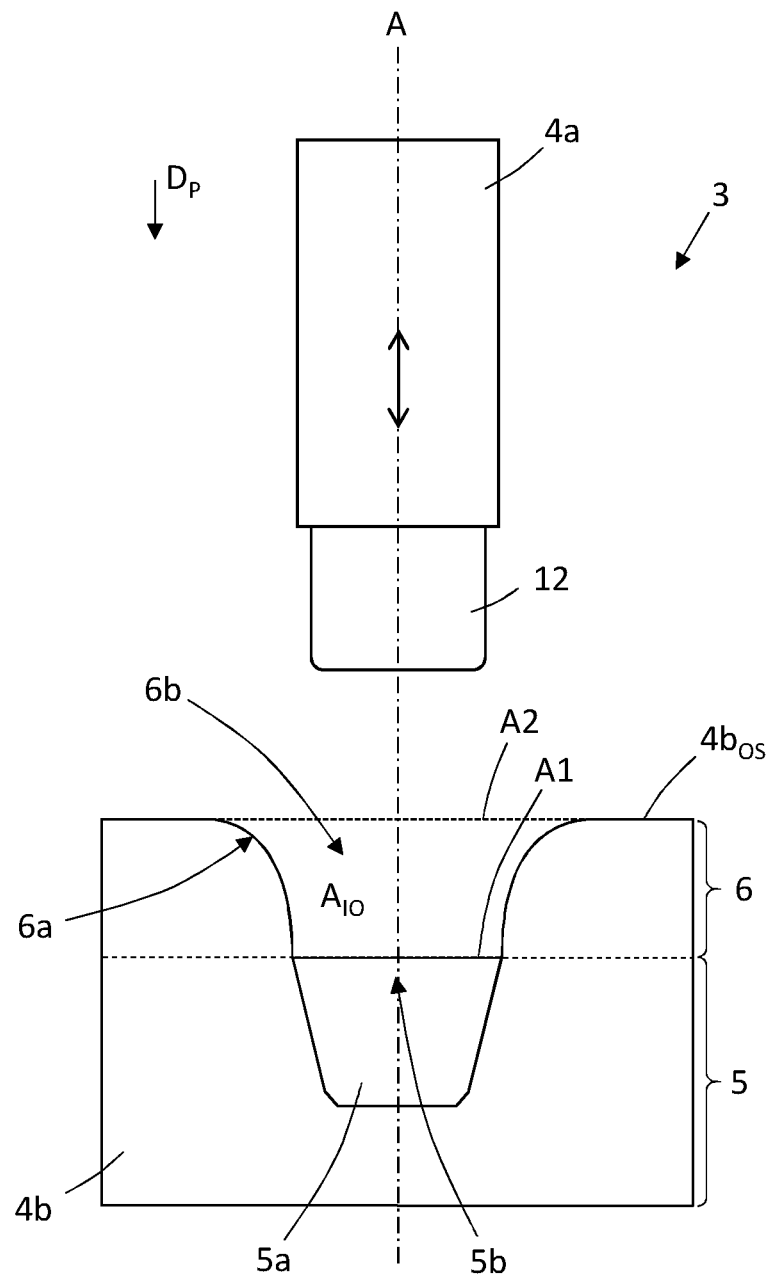
FIG. 1a-d show schematically, in cross-sectional views, a forming mould system according to the disclosure.

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In FIGS. 1a-d, 2, and 3a-f, a forming mould system 3 for forming a cellulose product 1 from an air-formed cellulose blank structure 2 is schematically illustrated. The forming mould system 3 comprises a first mould part 4a and a second mould part 4b, and the first mould part 4a and the second mould part 4b are configured for moving in relation to each other in a pressing direction $D_P$. In the embodiment illustrated in FIGS. 1a-d, 2, and 3a-f, the second mould part 4b is stationary and the first mould part 4a is movably arranged in relation to the second mould part 4b in the pressing direction $D_P$. As indicated with the double arrow in FIGS. 1a-b, the first mould part 4a is configured to move both towards the second mould part 4b and away from the second mould part 4b in linear movements along an axis A extending in the pressing direction $D_P$. In alternative embodiments, the first mould part 4a may be stationary with the second mould part 4b movably arranged in relation to the first mould part 4a, or both mould parts may be movably arranged in relation to each other. In this embodiment, a deformation element 12 is attached to the first mould part 4a.

Figure 3C:
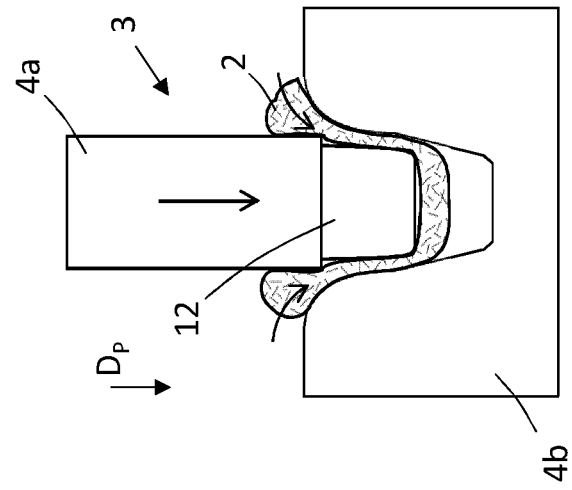
Figure 3B:
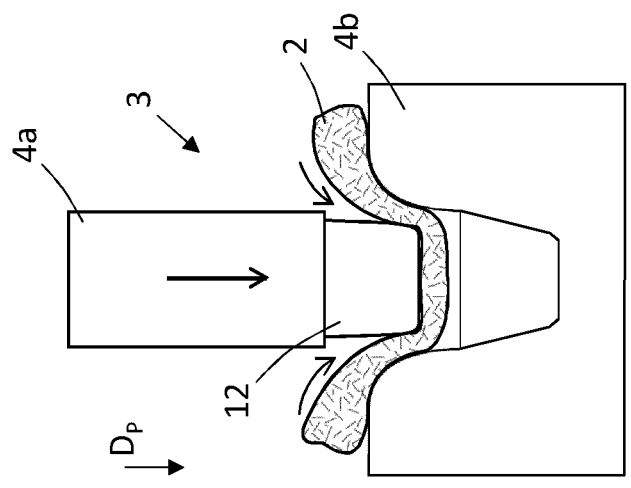
Figure 3A:
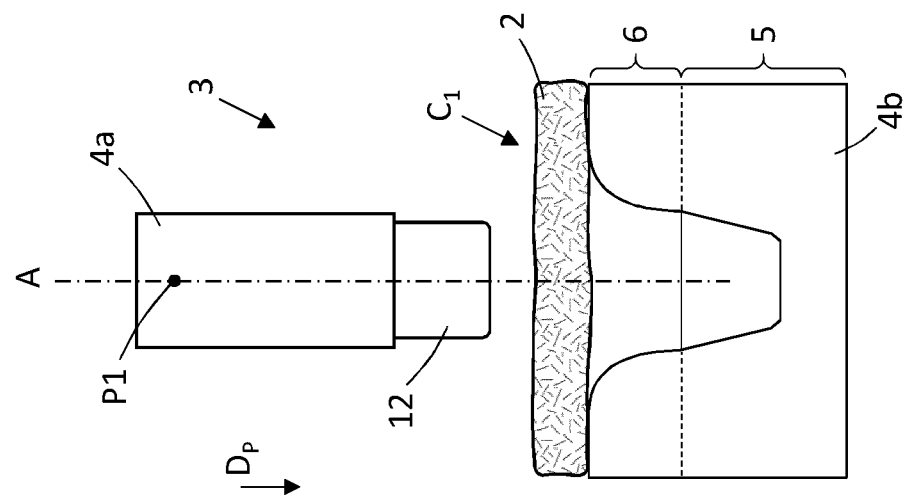

It should be understood that for all embodiments according to the disclosure, the expression moving in the pressing direction $D_P$ includes a movement along an axis A extending in the pressing direction $D_P$, and the movement may take place along the axis A in opposite directions. The expression further includes both linear and non-linear movements of a mould part for all embodiments, where the result of the movement during forming is a repositioning of the mould part between a first position P1 and a second position P2 on the axis A, where the axis A is extending in the pressing direction $D_P$, as schematically indicated in FIGS. 3a and 3e, where the movement of the mould part between position P1 and position P2 may be linear or non-linear. In the illustrated embodiment in FIGS. 3a and 3e, the first position P1 is an upper position and the second position P2 is a lower or lowest position P2 during forming.

With a cellulose blank structure 2 is according to the disclosure meant a fibre web structure produced from cellulose fibres. With air-forming of the cellulose blank structure 2 is meant the formation of a cellulose blank structure in a dry-forming process in which cellulose fibres are air-formed to produce the cellulose blank structure. When forming the cellulose blank structure 2 in the air-forming process, the cellulose fibres are carried and formed to the fibre blank structure 2 by air as carrying medium. This is different from a normal papermaking process or a traditional wet-forming process, where water is used as carrying medium for the cellulose fibres when forming the paper or fibre structure. In the air-forming process, small amounts of water or other substances may if desired be added to the cellulose fibres in order to change the properties of the cellulose product, but air is still used as carrying medium in the forming process. The cellulose blank structure 2 may if suitable have a dryness that is mainly corresponding to the ambient humidity in the atmosphere surrounding the air-formed cellulose blank structure 2. As an alternative, the dryness of the cellulose blank structure 2 can be controlled in order to have a suitable dryness level when forming the cellulose products 1.

The cellulose blank structure 2 may be formed of cellulose fibres in a conventional air-forming process and be configured in different ways. For example, the cellulose blank structure 2 may have a composition where the fibres are of the same origin or alternatively contain a mix of two or more types of cellulose fibres, depending on the desired properties of the cellulose products 1. The cellulose fibres used in the cellulose blank structure 2 are during the forming process of the cellulose products 1 strongly bonded to each other with hydrogen bonds. The cellulose fibres may be mixed with other substances or compounds to a certain amount as will be further described below. With cellulose fibres is meant any type of cellulose fibres, such as natural cellulose fibres or manufactured cellulose fibres.

The cellulose blank structure 2 may have a single-layer or a multi-layer configuration. A cellulose blank structure 2 having a single-layer configuration is referring to a cellulose blank structure that is formed of one layer containing cellulose fibres. A cellulose blank structure 2 having a multi-layer configuration is referring to a cellulose blank structure that is formed of two or more layers comprising cellulose fibres, where the layers may have the same or different compositions or configurations. The cellulose blank structure 2 may comprise a reinforcement layer comprising cellulose fibres, where the reinforcement layer is arranged as a carrying layer for other layers of the cellulose blank structure 2. The reinforcement layer may have a higher tensile strength than other layers of the cellulose blank structure 2. This is useful when one or more layers of the cellulose blank structure 2 have compositions with low tensile strength in order to avoid that the cellulose blank structure 2 will break during the forming of the cellulose products 1. The reinforcement layer with a higher tensile strength acts in this way as a supporting structure for other layers of the cellulose blank structure 2. The reinforcement layer may for example be a tissue layer containing cellulose fibres, an airlaid structure comprising cellulose fibres, or other suitable layer structures.

The cellulose blank structure 2 is a fluffy and airy structure, where the cellulose fibres forming the structure is arranged relatively loosely in relation to each other. The fluffy cellulose blank structure 2 is used for an efficient forming of the cellulose products 1, allowing the cellulose fibres to form the cellulose products 1 in an efficient way during the forming process.

As illustrated in FIGS. 1a-d, 2, and 3a-f, the second mould part 4b comprises a forming cavity section 5 and an inlet section 6, where the inlet section 6 is arranged in connection to the forming cavity section 5. In the illustrated embodiment, the inlet section 6 is arranged directly in connection to the forming cavity section 5. The inlet section 6 is configured for facilitating displacement of the cellulose blank structure 2 into a forming cavity 5a of the forming cavity section 5, The inlet section 6 comprises a transition surface 6a defining an inlet opening 6b. The inlet opening 6b of the inlet section 6 is having a tapered configuration towards the forming cavity 5a. The transition surface 6a may have any suitable shape providing the tapered configuration of the inlet opening 6b. In the embodiment illustrated in FIGS. 1a-d, 2, and 3a-f, the transition surface 6a forming the inlet opening 6b has a curved tapered configuration with a curved tapered cross-sectional shape towards the forming cavity 5a, and the inlet opening 6b of the inlet section 6 is having a tapered configuration in the pressing direction $D_P$ towards the forming cavity 5a. However, other suitable cross-sectional shapes may be used if desired, and other curved shapes may be used as well as non-curved shapes or combinations of different shapes. If using a curved cross-sectional shape, the transition surface 6a may be arranged with a specific radius. Such a radius may vary around the inlet opening 6b if desired. It should further be understood that the cross-sectional shape of the transition surface 6a could vary along the inlet opening 6b. In the embodiment illustrated in FIGS. 1a-d, 2, and 3a-f, the inlet section 6 is surrounding the forming cavity 5a. It may be possible in alternative embodiments to design the second mould part 4a with an inlet section 6 that only partly is surrounding the forming cavity 5a.

Figure 2:
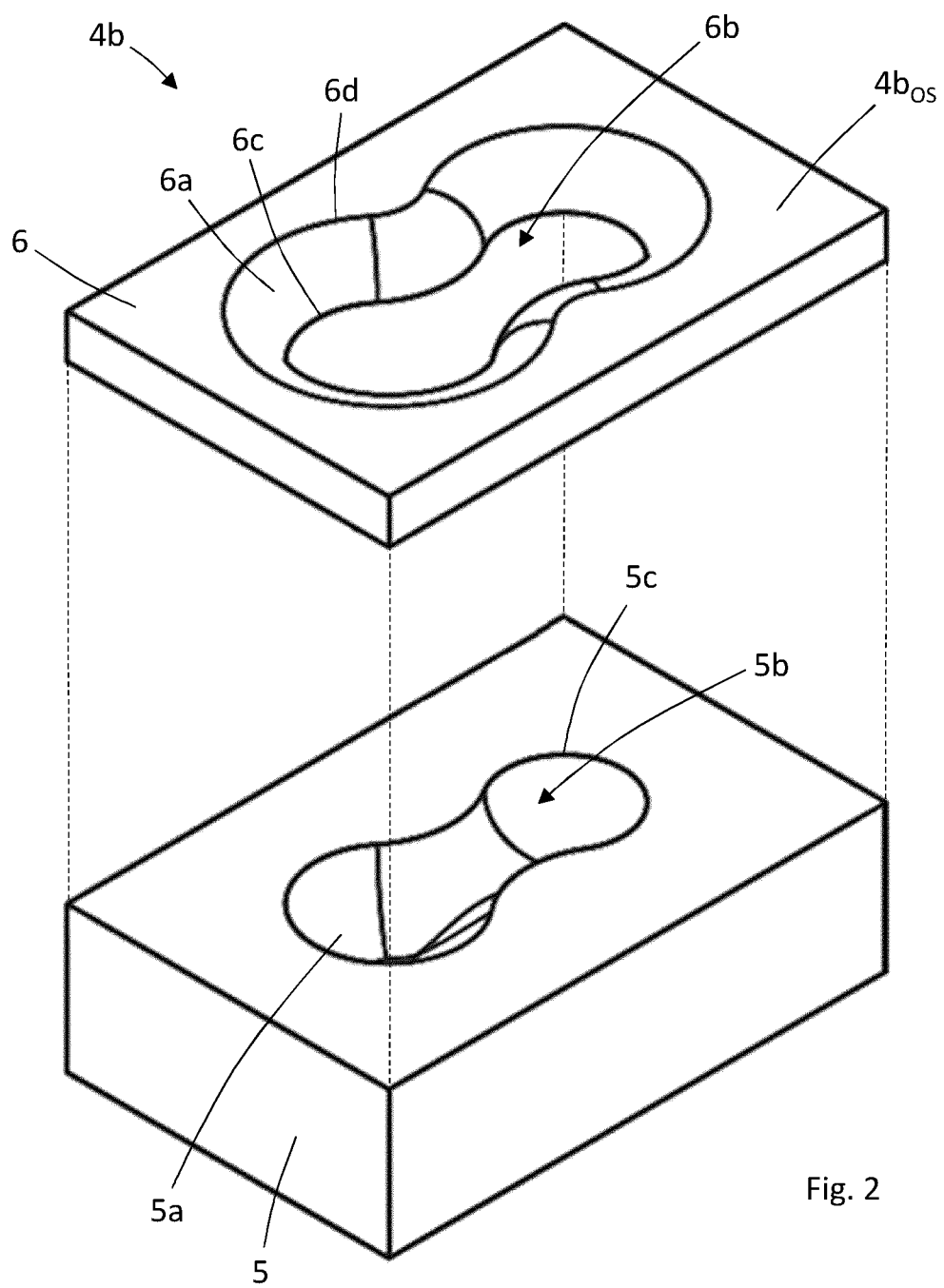
FIG. 2 shows schematically, in an exploded perspective view, a mould part of the forming mould system with a forming cavity section and an inlet section according to the disclosure.

An exploded perspective view of the second mould part 4b is shown in FIG. 2 to illustrate the configuration of the different sections of the mould part. In the figure, the forming cavity section 5 with the forming cavity 5a, and the inlet section 6 with the inlet opening 6b formed by the transition surface 6a, are shown. The second mould part 4b may be formed with the forming cavity section 5 and the inlet section 6 integrated into a common structural part, where the inlet section 6 is arranged as an integrated structure of the second mould part 4b. Alternatively, the forming cavity section 5 and the inlet section 6 may be arranged as two or more joined separate structural parts. The forming cavity section 5 and the inlet section 6 may both be made of the same suitable material or material composition, or alternatively from different suitable materials or material compositions. Suitable materials or material compositions may for example be aluminium, steel, other metals or alloys, composite materials, ceramic materials, or combinations of different materials.

As shown in FIGS. 1a-d and 2, the transition surface 6a is extending from an outer mould section $4b_{OS}$ of the second mould part 4b towards a cavity inlet opening 5b of the forming cavity 5a. The cavity inlet opening 5b of the forming cavity 5a is arranged as the outer section of the forming cavity 5a, through which the cellulose blank structure 2 is inserted into the forming cavity 5a during the forming process. The cavity inlet opening 5b, as shown in FIG. 2, is defined by an outer periphery 5c of the forming cavity 5a, surrounding the forming cavity 5a. The inlet opening 6b formed by the transition surface 6a is delimited by an inner periphery 6c and an outer periphery 6d surrounding the inlet opening 6b, as shown in FIG. 2. The transition surface 6a is thus extending between the outer periphery 6d and the inner periphery 6c. The outer periphery 5c of the forming cavity 5a is in this embodiment arranged in direct connection to the inner periphery 6c of the inlet opening 6b.

For all embodiments according to the disclosure, with the tapered configuration of the inlet opening 6b is meant that the inlet opening is narrowing when moving from the outer mould section $4b_{OS}$ towards the cavity inlet opening 5b. The transition surface 6a is thus configured to decrease the area of the inlet opening 6b between the outer mould section $4b_{OS}$ and the cavity inlet opening 5b.

With reference to the embodiment illustrated in FIG. 1a, the tapered configuration of the inlet opening 6a is exemplified with a cross-sectional area $A_{IO}$ of the inlet opening 6a. The cross-sectional area $A_{IO}$ of the inlet opening 6b is decreasing when moving towards the forming cavity 5a. The cross-sectional area $A_{IO}$ in the embodiment illustrated in FIG. 1a is due to the configuration of the second mould part 4b in relation to the pressing direction $D_P$ measured as an area of the inlet opening 6a in a plane perpendicular to the pressing direction $D_P$. In the embodiment illustrated in FIG. 1a, with the tapered configuration of the cross-sectional area a first cross-sectional area A1 of a section of the inlet opening 6a closest to the forming cavity inlet opening 5b is smaller than a second cross-sectional area A2 of a section of the inlet opening arranged in connection to the outer mould section $4b_{OS}$.

With the expression tapered configuration is in the different embodiments thus meant that the transition surface 6a has a configuration that is narrowing towards the forming cavity. With the expression curved tapered configuration is in the different embodiments meant that the transition surface 6a forming the inlet opening 6b has a curved tapered cross-sectional shape towards the forming cavity 5a, and the transition surface 6a has thus a curved surface configuration that is narrowing towards the forming cavity 5a.

The transition surface 6a may be defined to end where the transition surface 6a merges into a direction parallel to the pressing direction $D_P$ in any point along the inlet opening 6b. Thus, the inner periphery 6c is in such a case defined by the points where the transition surface 6a merges into the direction parallel to the pressing direction $D_P$.

Figure 1B:
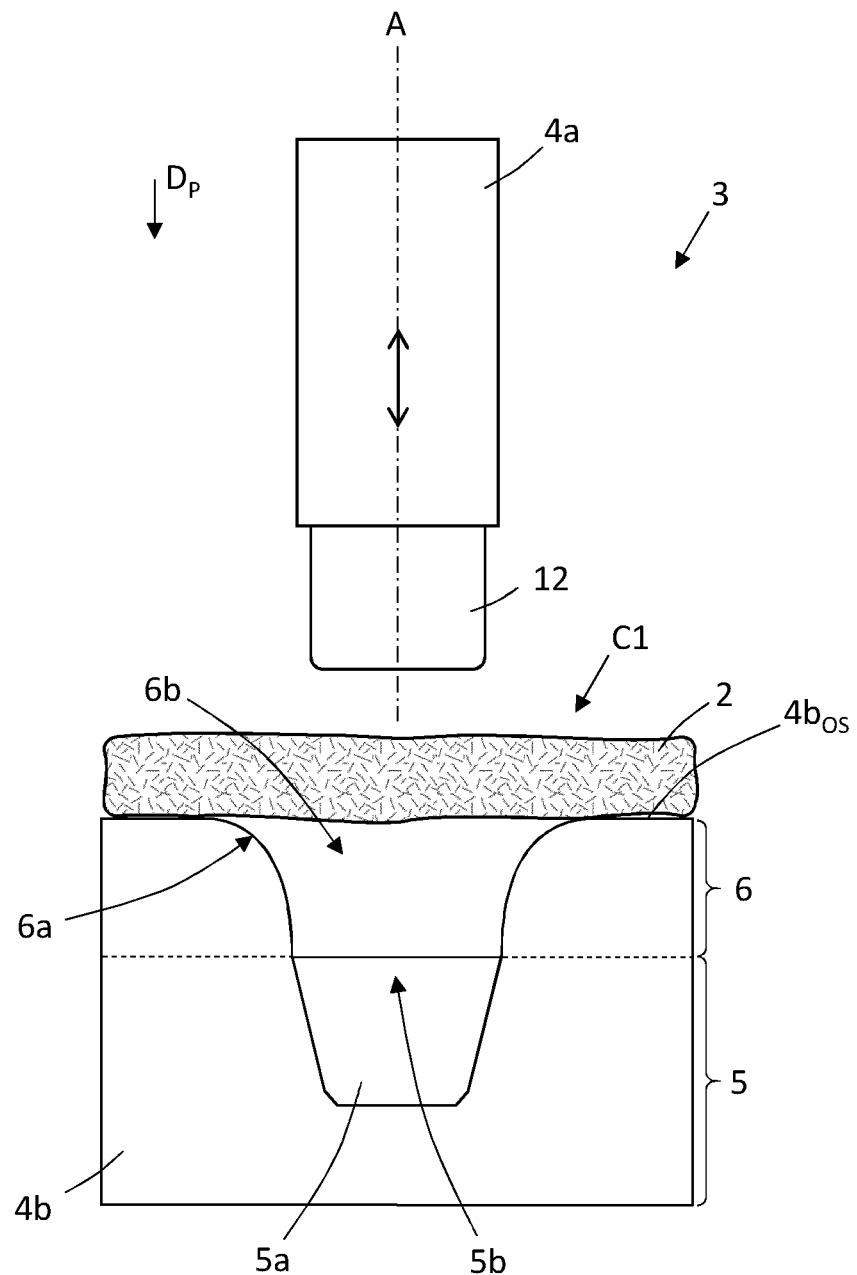
Figure 1C:
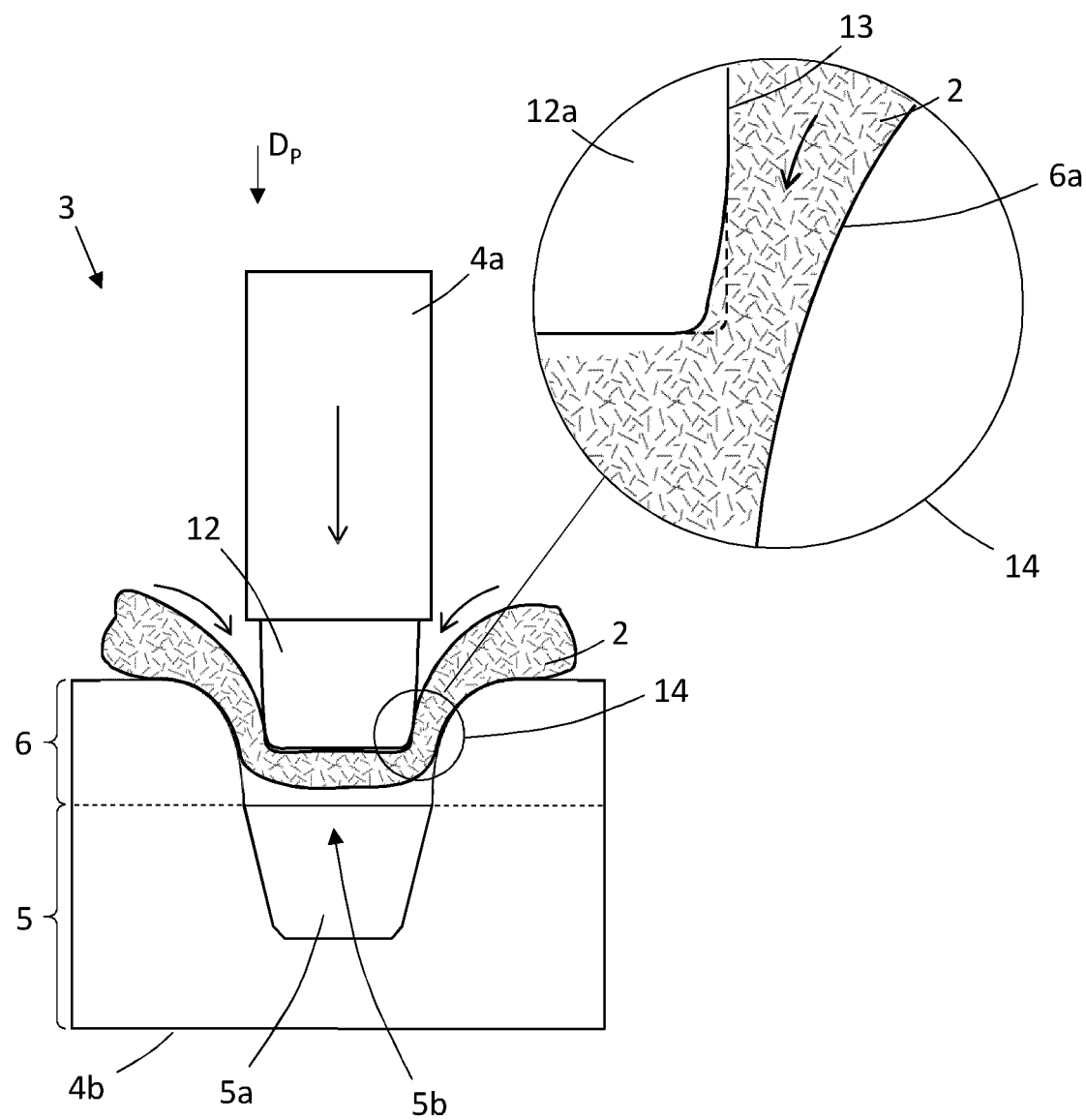
Figure 1D:
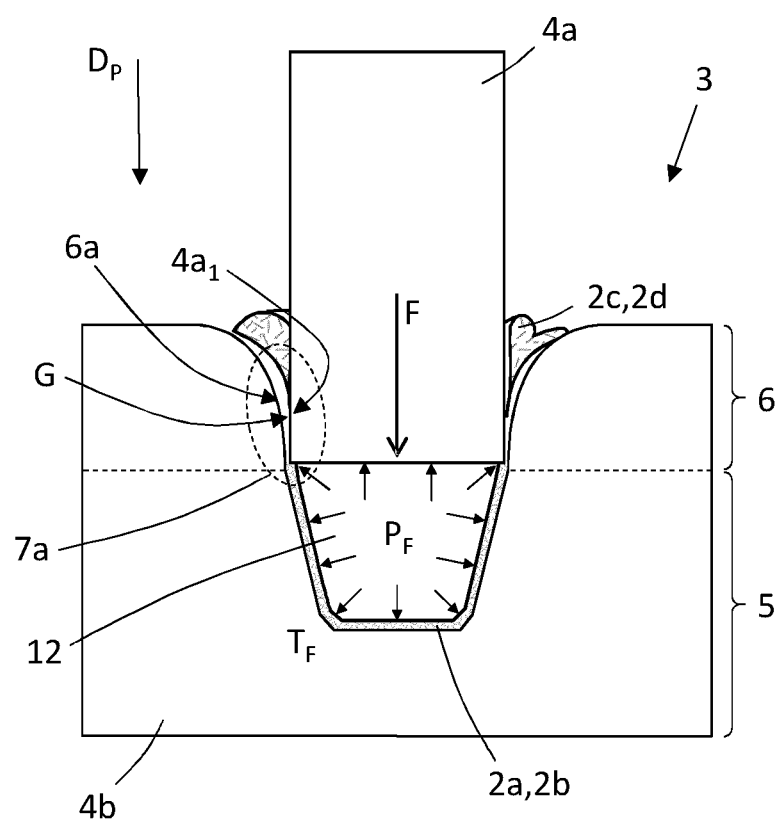

A first wall surface section $4a_1$ of the first mould part 4a and the transition surface 6a are forming an inner tearing arrangement 7a, as schematically illustrated in FIG. 1d. The inner tearing arrangement 7a is configured for at least partly separating a cellulose blank structure part 2b from the cellulose blank structure 2 between the first wall surface section $4a_1$ and the transition surface 6a. During the tearing process, the cellulose blank structure 2 is separated into cellulose blank structure part 2b and a separated cellulose blank structure 2d. The cellulose blank structure part 2b is used for forming the cellulose product 1, and residual cellulose 2c in the separated cellulose blank structure 2d may be recycled and used again.

In the embodiment illustrated in FIGS. 1a-d, 2, 3a-f, the first wall surface section $4a_1$ is formed by an outer side wall surface of the first mould part 4a. It should however be understood that any suitable wall surface section of the first mould part 4a may be used for cooperating with the transition surface 6a for forming the inner tearing arrangement 7a. During the movement of the first mould part 4a towards the second mould part 4b, the first wall surface section $4a_1$ is approaching the transition surface 6a, wherein a gap G is formed between the first wall surface section $4a_1$ and the transition surface 6a. The gap G is having a narrowing configuration between the first wall surface section $4a_1$ and the transition surface 6a, as shown in FIG. 1d, and during the movement of the mould parts in relation to each other, the cellulose blank structure 2 is pushed by the first mould part 4a into the forming cavity 5a. During the movement of the cellulose blank structure 2 into the forming cavity, the narrowing gap is tearing the cellulose blank structure 2 between the first wall surface section $4a_1$ and the transition surface 6a, into the cellulose blank structure part 2b and the separated cellulose blank structure 2d. During the tearing process, the cellulose blank structure 2 will be fully separated, or at least partly separated, into the cellulose blank structure part 2b and the separated cellulose blank structure 2d, depending on the configuration of the first wall surface section $4a_1$ and the transition surface 6a. The shorter distance between the first wall surface section $4a_1$ and the transition surface $6a$, the narrower gap G leading to a more complete separation will be established.

After the at least partly separation of the cellulose blank structure 2 into cellulose blank structure part $2b$ and a separated cellulose blank structure $2d$, the final pressing of the cellulose blank structure part $2b$ into its final product shape is performed. This allows for the sides of the final product to obtain a smooth surface structure as the forming pressure on the cellulose blank structure part $2b$ is essentially perpendicular to the sides of the cellulose blank structure part $2b$ as can be seen in FIG. $1d$. Thereby, surfaces extending perpendicularly to the pressing direction $D_P$ can be avoided and straight product sides with a smooth surface structure are obtained. This can further be seen in for instance the sequence of FIGS. $3a$-$3f$, where the separation of the cellulose blank structure 2 into the cellulose blank structure part $2b$ and the at least partly separated cellulose blank structure $2d$ is shown in FIG. $3d$ and the pressing of the cellulose blank structure part $2b$ into its final product shape is shown in FIG. $3e$. As can be seen in FIG. $3f$, the cellulose product 1 has essentially straight sides with no edges extending in a direction essentially perpendicular to the pressing direction $D_P$ or normal to the sides of the cellulose product. The sides can suitably also be curved, still with no edges extending in a direction essentially perpendicular to the pressing direction $D_P$ or essentially normal or perpendicular to an outer side surface of the cellulose product 1.

The system and method according to the disclosure can in other non-illustrated embodiments be used for cellulose products comprising edges extending in a direction essentially perpendicular to the pressing direction $D_P$ if desired.

It should be understood that tearing in accordance with the disclosure is a process and mechanism different from cutting. Tearing is the act of breaking apart a material by force, without the aid of a cutting tool. Unlike a cut, which is generally on a straight or patterned line controlled by a tool, a tear is generally uneven to a certain extent. Materials vary in their susceptibility to tearing, and tests have clearly shown that the cellulose blank structure 2 is suitable for separation by tearing.

As described above, the transition surface $6a$ is having a curved tapered configuration, as illustrated in the embodiment shown in FIGS. $1a$-$d$, 2, $3a$-$f$, where the cross-sectional shape of the transition surface $6a$ is formed by a curve from the outer mould section $4b_{OS}$ to the forming cavity $5a$. The transition surface $6a$ may in alternative embodiments, be divided into two or more surface sections if suitable for forming the cellulose products. The transition surface $6a$ may for example comprise two surface sections, where a first surface section is extending from the outer mould section $4b_{OS}$ a certain distance towards the forming cavity $5a$, and a second surface section is extending from the first surface section towards the forming cavity $5a$, depending on the configuration of the inlet section 6. The first surface section may for example have a curved tapered configuration and the second surface section may for example have a different curved tapered configuration or a frustoconical-like tapered configuration. By having two or more sections of the transition surface $6a$ with different configurations, the displacement and tearing of the cellulose blank structure 2 can be efficiently controlled.

Figure 4:
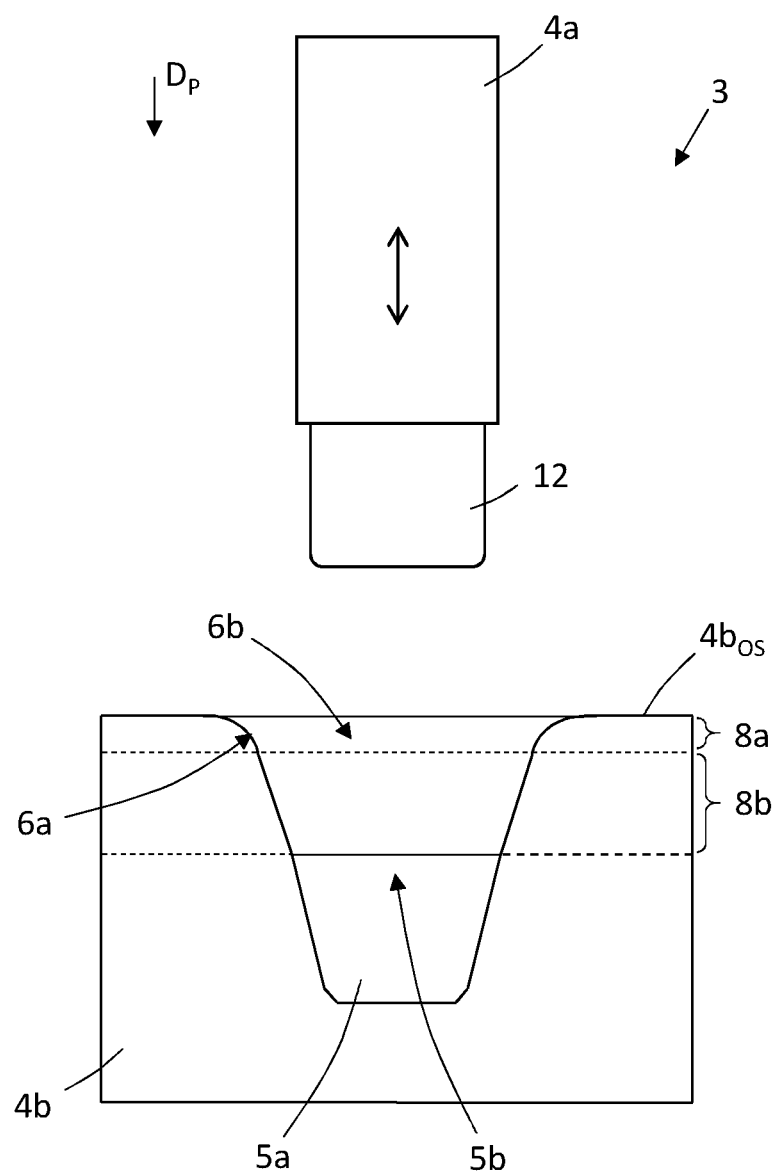
FIG. 4 shows schematically, in a cross-sectional view, a forming mould system according to another embodiment of the disclosure.

In FIG. 4, an alternative illustrative embodiment of the forming mould system 3 is schematically shown. In this embodiment, a second mould part $4b$ is having a transition surface $6a$ with two surface sections. The transition surface $6a$ comprises a first surface section $8a$ extending in the pressing direction $D_P$ from the outer mould section $4b_{OS}$ in a direction towards the forming cavity $5a$, and a second surface section $8b$ extending in the pressing direction $D_P$ from the first surface section $8a$ to the forming cavity $5a$. The first surface section $8a$ has a curved tapered configuration, and the second surface section $8b$ has a frustoconical-like tapered configuration. It should be understood that other tapered configurations may be used for the two surface sections.

In an alternative embodiment, schematically illustrated in FIGS. $5a$-$b$, the second mould part $4b$ of the forming mould system 3 further comprises an edge forming section 9. The edge forming section 9 is configured for pre-shaping the cellulose blank structure part $2b$ and forming an edge $1a$ of the cellulose product 1 during the forming process. This can for instance be used to provide the edge $1a$ with a specific shape different from the remainder of the side of the cellulose product 1. For example, the edge $1a$ can be provided with a curvature, the edge $1a$ can be made straight if the sides of the cellulose product are curved, or a straight edge $1a$ can be made to extend along a different angle than the remainder of the side of the cellulose product 1. The edge forming section 9 may further be used for fully separating the cellulose blank structure 2 into the cellulose blank structure part $2b$ and the separated cellulose blank structure $2d$. The edge forming section 9 is arranged between the inlet section 6 and the forming cavity section 5. The inlet section 6 and the forming cavity section 5 may be configured as described in the embodiments above. The edge forming section 9 is providing a distance between the inlet section 6 and the forming cavity section 5, and has the purpose to form the edge $1a$ of the cellulose product 1. The edge $1a$ is being formed when the cellulose fibres of the cellulose blank structure part $2b$ are being pushed into the forming cavity $5a$, where the fibres arranged at an upper section of the cellulose blank structure part $2b$ are being compressed and shaped into the edge $1a$ when the cellulose blank structure part $2b$ is being further pushed into the forming cavity $5a$ by the first mould part $4a$. The compression and transportation of fibres in the pressing direction $D_P$ is supporting the formation of a compact and well-defined edge $1a$. The edge forming section 9 may also be used for ensuring an efficient separation of cellulose fibres after tearing the cellulose blank structure if the forming mould system 3 is arranged with an inner tearing arrangement $7a$. The configuration and extension of the edge forming section 9 between the inlet section 6 and the forming cavity section 5 may vary depending on the design of the mould part. The edge forming section 9 may for example have a varied extension between the inlet section 6 and the forming cavity section 5, or as schematically shown in FIGS. $5a$-$b$ have a uniform extension between the inlet section 6 and the forming cavity section 5. The edge forming section 9 comprises a wall surface $9a$, which is defining an opening $9b$ of the edge forming section 9. The wall surface $9a$ is through the extension between the inlet section 6 and the forming cavity section 5, connecting the inlet section 6 and the forming cavity section 5. The wall surface $9a$ is extending in the pressing direction $D_P$, as schematically shown in FIG. $5a$, or essentially in the pressing direction $D_P$, between the inlet section 6 and the forming cavity section 5. The wall surface $9a$ is extending between an inner periphery $9c$ of the opening $9b$ and an outer periphery $9d$ of the opening $9b$. The inner periphery $9c$ of the opening $9b$ is arranged in connection to the outer periphery $5c$ of the forming cavity $5a$. The outer periphery $9d$ of the opening $9b$ is arranged in connection to the inner periphery 6c of the inlet opening 6b. The wall surface 9a is in the shown embodiment thus extending between the inner periphery 6c of the inlet opening 6 and the outer periphery 5c of the forming cavity 5a.

Figure 5A:
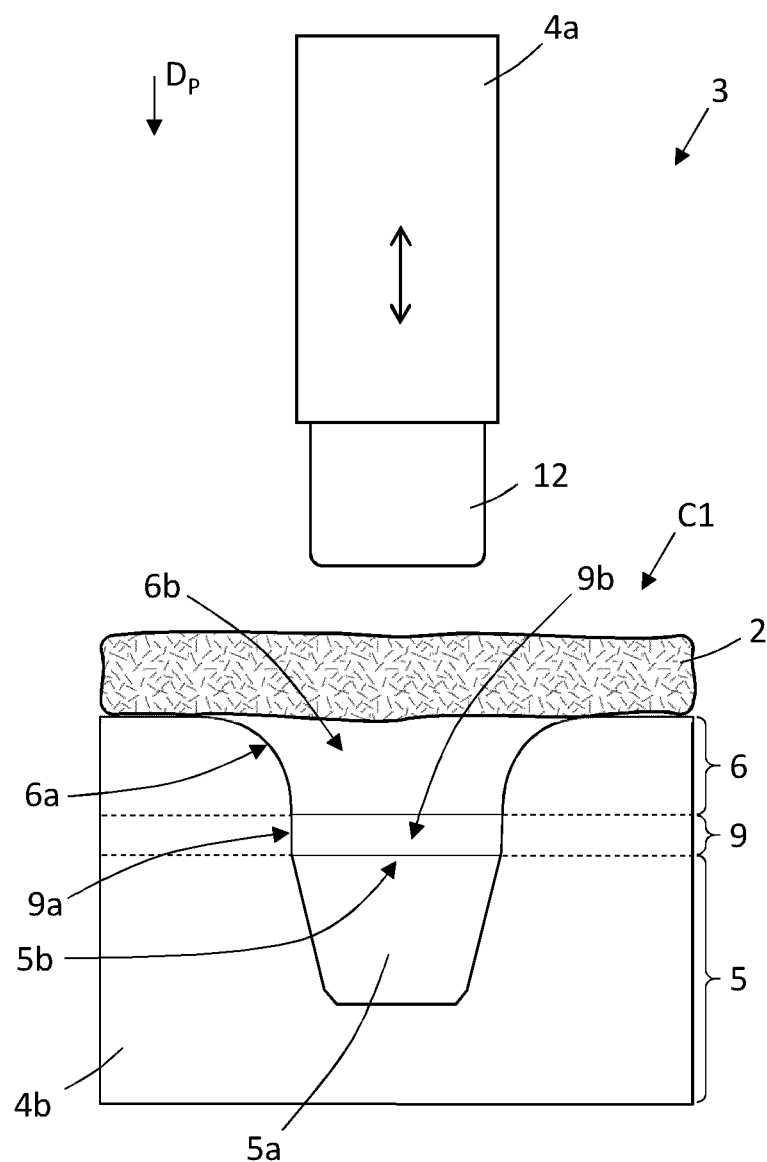
FIG. 5a-b show schematically, in a cross-sectional view and in an exploded perspective view, a forming mould system and a mould part of the forming mould system, according to another embodiment of the disclosure.
Figure 5B:
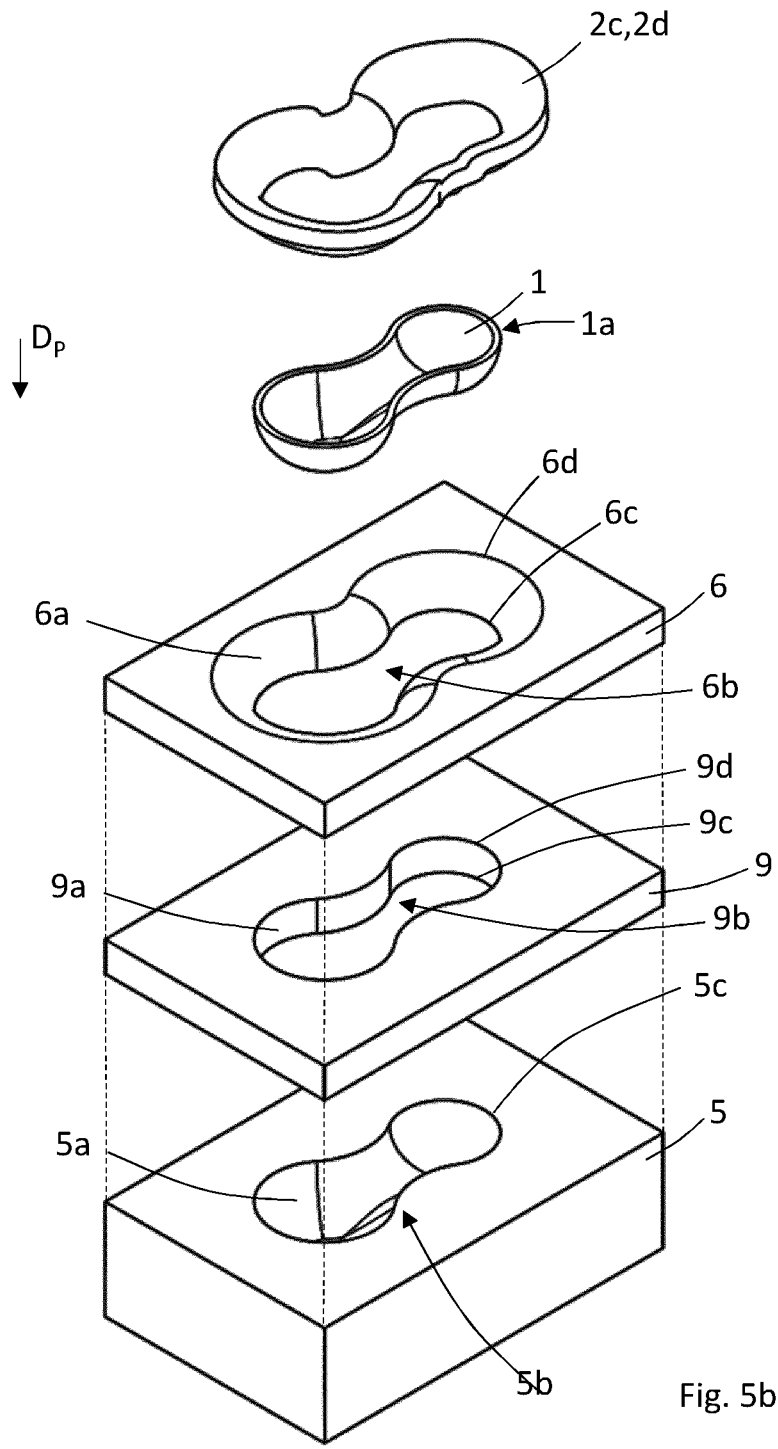

To form the cellulose product 1 from the air-formed cellulose blank structure 2 in the forming mould system 3, the air-formed cellulose blank structure 2 is provided and fed to the forming mould system 3 with suitable feeding means. The cellulose blank structure 2 is arranged in connection to the inlet section 6 in a first configuration $C_1$ in a position between the first mould part 4a and the second mould part 4b, as shown in FIGS. 1b, 3a and 5a. To illustrate the forming of the cellulose products 1 in the forming mould system 3, the different step will be described below in connection to the embodiment illustrated in FIGS. 3a-f. It should be understood that the steps may be the same for the other embodiments described. The first mould part 4a and/or the second mould part 4b are moved in the pressing direction $D_P$, and during the movement the cellulose blank structure 2 is displaced into the forming cavity 5a with the first mould part 4a, as shown in FIGS. 3b-d. During the displacement of the cellulose blank structure 2a shaping of the cellulose blank structure 2 is controlled with the transition surface 6a from the first configuration $C_1$ into a second configuration $C_2$, as shown in FIG. 3d, where the cellulose blank structure 2 in the second configuration $C_2$ is shaped into a three-dimensional cellulose blank body 2a.

The cellulose product 1 is formed by heating the three-dimensional cellulose blank body 2a to a forming temperature $T_F$ and pressing the three-dimensional cellulose blank body 2a in the forming cavity 5a between the first mould part 4a and the second mould part 4b with a forming pressure $P_F$, as illustrated in FIG. 3e. In FIG. 3f, the forming of the cellulose product 1 has been completed and the first mould part 4a is moved in a direction away from the second mould part 4b. The cellulose product 1 can now be removed from the forming mould system 3, and the residual cellulose 2c of the separated cellulose blank structure 2d can be recycled for further use. A pressing force F is establishing the forming pressure $P_F$ in the mould system 3.

As shown in FIG. 3d, the first wall surface section $4a_1$ of the first mould part 4a and the transition surface 6a are forming the inner tearing arrangement 7a. During the movement of the first mould part 4a and/or the second mould part 4b in the pressing direction $D_P$, the inner tearing arrangement 7a is at least partly tearing the cellulose blank structure 2 between the first wall surface section $4a_1$ and the transition surface 6a. During the tearing of the cellulose blank structure 2, the cellulose blank structure part 2b is separated from the cellulose blank structure 2, and the at least partly separated cellulose blank structure part 2b is forming the three-dimensional cellulose blank body 2a in the second configuration $C_2$.

The first configuration $C_1$ of the cellulose blank structure 2 is for example a flat shape, or essentially flat shape. The three-dimensional cellulose blank body 2a may further for example be shaped into a pleated three-dimensional configuration in the second configuration $C_2$. During displacement of the cellulose blank structure 2 from the first configuration $C_1$ into the second configuration $C_2$, the cellulose blank structure 2 may be compressed or compacted to improve the displacement of the cellulose blank structure 2 and the forming of the cellulose products 1. A compressed or compacted cellulose blank structure 2 is having a higher tensile strength due to a closer interaction between the cellulose fibres in the cellulose blank structure 2. The compressed or compacted cellulose blank structure 2 has an improved breakage resistance when being displaced into the forming cavity 5a, and is less prone to break or form cracks during the transport into the forming cavity 5a.

The tapered configuration of the transition surface 6a is configured for controlling the shaping of the cellulose blank structure 2 from the first configuration $C_1$ into the second configuration $C_2$ in which the cellulose blank structure 2 is shaped into a three-dimensional cellulose blank body 2a in the forming cavity 5. The shaping is taking place during movement of the first mould part 4a and the second mould part 4b towards each other in the pressing direction $D_P$, and displacement of the cellulose blank structure 2 from the first configuration $C_1$ into the second configuration $C_2$.

Depending on the design of the forming mould system 3, the transition surface 6a may be arranged to extend from the outer mould section $4b_{OS}$ to a curve around the periphery of the inlet opening, where in each point of the curve the transition surface 6a is parallel to the pressing direction $D_P$. The outer mould section $4b_{OS}$ may be arranged as a planar surface arranged perpendicular to the pressing direction $D_P$, or essentially perpendicular to the pressing direction $D_P$.

The forming mould system may if desired further comprise a cutting edge arranged in the second mould part instead of a tearing arrangement, where the cutting edge is surrounding the cavity inlet opening 5b of the forming cavity 5a and arranged in connection to the inlet section 6. The cellulose blank structure 2 may be cut with the cutting edge when the cellulose blank structure 2 has been displaced into the second configuration $C_2$.

The first mould part 4a and/or the second mould part 4b may for the different embodiments, as described above, comprise the deformation element 12, and the deformation element 12 is exerting the forming pressure $P_F$ on the three-dimensional cellulose blank body 2a in the forming cavity 5a during forming of the cellulose product 1. A suitable traditional heating unit, such as a heated forming mould part or heated forming mould parts may be used for establishing the forming temperature $T_F$. In the different embodiments, the forming pressure $P_F$ is in the range 1-100 MPa, preferably 4-20 MPa, and the forming temperature $T_F$ is in the range 100-300° C. By using the deformation element 12, the forming pressure $P_F$ may be an isostatic forming pressure, as will be further described below.

Figure 6:
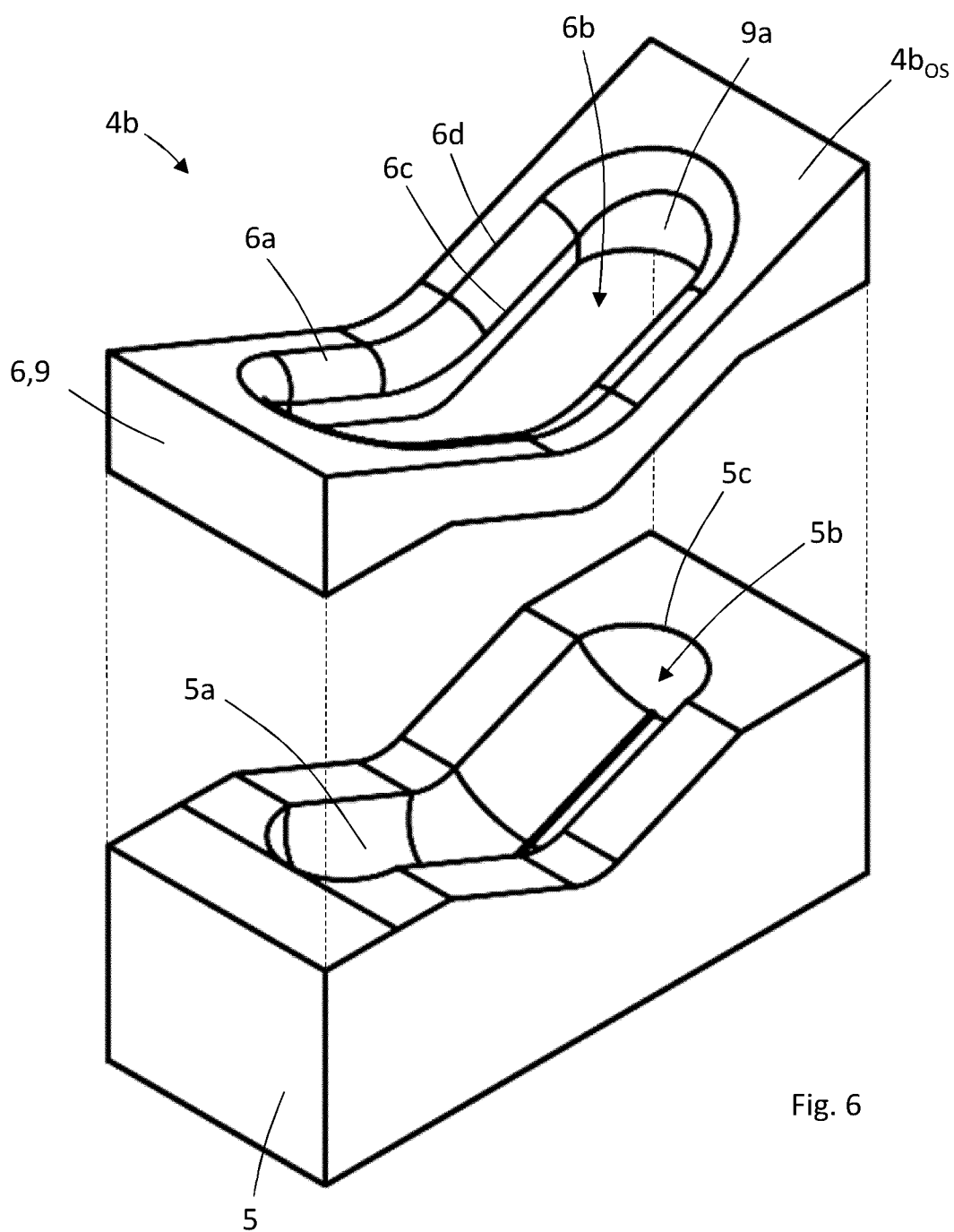
FIG. 6 shows schematically, in an exploded perspective view, a mould part of the forming mould system with a forming cavity section and an inlet section according to another embodiment of the disclosure.

In FIG. 6, an alternative embodiment of the second mould part 2b is schematically illustrated in an exploded view, where the forming cavity section 5 for illustrative purposes is separated from the inlet section 6 and the edge forming section 9. In this embodiment the sections are having shaped configurations different from the ones described in the embodiments above. As shown in FIG. 6, the inlet section 6 together with the edge forming section 9 are having a shaped V-like configuration, and the forming cavity section 5 is having a configuration that is matching the configuration of the edge forming section 9. The inlet section 6 is arranged in connection to the edge forming section 9, which in turn is arranged in connection to the forming cavity section 5. In the same way as described in relation to the embodiments above, the inlet section 6 is configured for facilitating displacement of the cellulose blank structure 2 into the forming cavity 5a of the forming cavity section 5. The inlet section 6 comprises a transition surface 6a defining an inlet opening 6b. The inlet opening 6b of the inlet section 6 is having a tapered configuration towards the forming cavity 5a, and the transition surface 6a may have any suitable shape providing the tapered configuration of the inlet opening 6b. In the embodiment illustrated in FIG. 6, the transition surface 6a forming the inlet opening 6b has a curved tapered configuration with a curved tapered cross-sectional shape towards the forming cavity 5a, and the inlet opening 6b of the inlet section 6 is having a tapered configuration in the pressing direction $D_P$ towards the forming cavity 5a. However, other suitable cross-sectional shapes may be used if desired, and other curved shapes may be used as well as non-curved shapes or combinations of different shapes. In the embodiment illustrated in FIG. 6, the inlet section 6 is surrounding the forming cavity 5a. The edge forming section 9 comprises a wall surface 9a with the same configuration and function as described in the embodiments above.

In the embodiment shown in FIG. 6, the second mould part 4b may be made with the forming cavity section 5, the edge forming section 9, and the inlet section 6 integrated into a common structural part. Alternatively, the forming cavity section 5, the edge forming section 9, and the inlet section 6, may be arranged as two or more joined separate structural parts. The transition surface 6a is extending from an outer mould section $4b_{OS}$ of the second mould part 4b towards the cavity inlet opening 5b of the forming cavity 5a. The outer mould section $4b_{OS}$ is in this embodiment having a v-shaped configuration. The cavity inlet opening 5b of the forming cavity 5a is arranged as the outer section of the forming cavity 5a, through which the cellulose blank structure 2 is inserted into the forming cavity 5a during the forming process. The cavity inlet opening 5b may, as shown in FIG. 6, be defined by an outer periphery 5c of the forming cavity 5a, surrounding the forming cavity 5a. The inlet opening 6b formed by the transition surface 6a may be delimited by an inner periphery 6c and an outer periphery 6d surrounding the inlet opening 6b, as shown in FIG. 6. The transition surface 6a is thus extending between the outer periphery 6d and the inner periphery 6c. The wall surface 9a of the edge forming section 9 is extending between the outer periphery 5c of the forming cavity 5a and the inner periphery 6c of the inlet opening 6b.

The forming mould system may be designed with more than one tearing arrangement. In an alternative embodiment illustrated in FIGS. 7a-g, the forming mould system 3 comprises the first mould part 4a and the second mould part 4b. The first mould part 4a and the second mould part 4b are configured for moving in relation to each other in the pressing direction $D_P$. In the embodiment illustrated in FIGS. 7a-g, the first mould part 4a is stationary and the second mould part 4b is movably arranged in relation to the first mould part 4a in the pressing direction $D_P$. As illustrated in FIGS. 7a-g, the second mould part 4b comprises the forming cavity section 5, the edge forming section 9, and the inlet section 6, in the same way as described in connection to the embodiments above. In this embodiment, the deformation element 12 is attached to the forming cavity 5a of the second mould part 4b. The inlet section 6 comprises the transition surface 6a defining the inlet opening 6b. The transition surface 6a may be configured as described in the embodiments above, and the inlet opening 6b of the inlet section 6 is thus having a tapered configuration towards the forming cavity 5a.

As shown in FIGS. 7a-g, the transition surface 6a is extending from the outer mould section $4b_{OS}$ of the second mould part 4b towards the cavity inlet opening 5b of the forming cavity 5a. The cavity inlet opening 5b of the forming cavity 5a is arranged as the outer section of the forming cavity 5a, through which the cellulose blank structure 2 is inserted into the forming cavity 5a during the forming process. The cavity inlet opening 5b is defined by the outer periphery of the forming cavity 5a, surrounding the forming cavity 5a. The inlet opening 6b formed by the transition surface 6a is delimited by an inner periphery and an outer periphery surrounding the inlet opening 6b, where the transition surface 6a is extending between the outer and inner peripheries.

The first wall surface section $4a_1$ of the first mould part 4a and the transition surface 6a are forming the inner tearing arrangement 7a, as schematically illustrated in FIGS. 7a-g, with the same configuration and function as described above. During the tearing process, the cellulose blank structure 2 is separated into a cellulose blank structure part 2b and a separated cellulose blank structure 2d. In the embodiment illustrated in FIGS. 7a-g, the first wall surface section $4a_1$ is formed by an outer side wall surface of the first mould part 4a. It should however be understood that any suitable wall surface section of the first mould part 4a may be used for cooperating with the transition surface 6a for forming the inner tearing arrangement 7a. During the movement of the first mould part 4a towards the second mould part 4b, the first wall surface section $4a_1$ is approaching the transition surface 6a, wherein a gap with the same configuration and function as described above is formed between the first wall surface section $4a_1$ and the transition surface 6a.

Figure 7A:
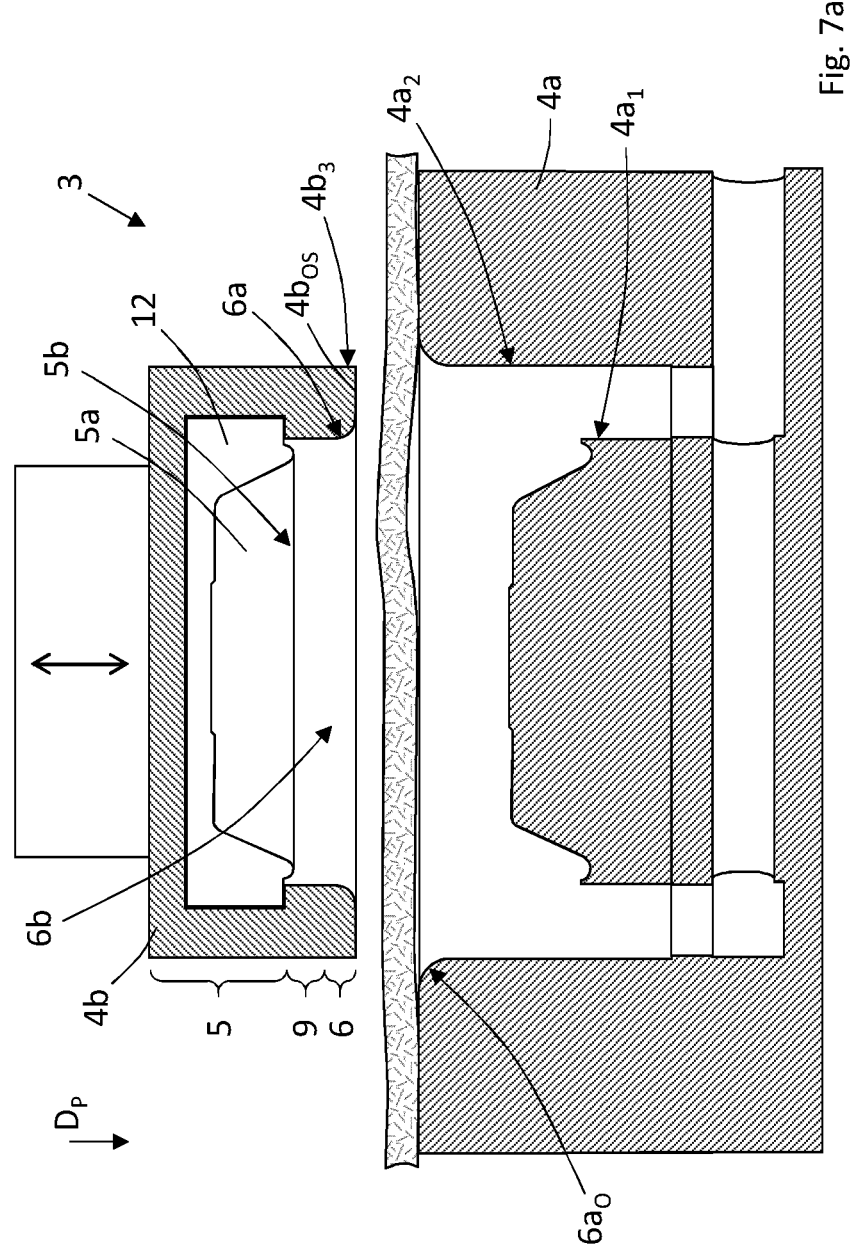

In the embodiment shown in FIGS. 7a-g, the first mould part 4a further comprises a second wall surface section $4a_2$ arranged outwardly of the first wall surface section $4a_1$. The second wall surface section $4a_2$ is, as shown in the figures, forming an outer structural part of the first mould part 4a. The second mould part 4b comprises a third wall surface section $4b_3$ arranged outwardly of the inlet opening 6b. The second wall surface section $4a_2$ and the third wall surface section $4b_3$ are forming an outer tearing arrangement 7b. The outer tearing arrangement 7b is configured for pre-separating, or at least partly pre-separating, the cellulose blank structure 2 into a pre-separated cellulose blank structure 2e between second wall surface section $4a_2$ and the third wall surface section $4b_3$, with the same function and configuration as the inner tearing arrangement 7a described above. As schematically illustrated in FIG. 7a, the second wall surface section $4a_2$ is arranged with an outer transition surface $6a_O$ having the same tapered configuration as the transition surface 6a described in connection to the embodiments above. With the outer tearing arrangement 7b, the cellulose blank structure 2 may be fully pre-separated, or partly pre-separated, before tearing, or at least partly tearing, the cellulose blank structure 2 with the inner tearing arrangement 7a. The pre-separating step is simplifying the displacement of the cellulose blank structure 2 into the forming cavity 5a.

Figure 7G:
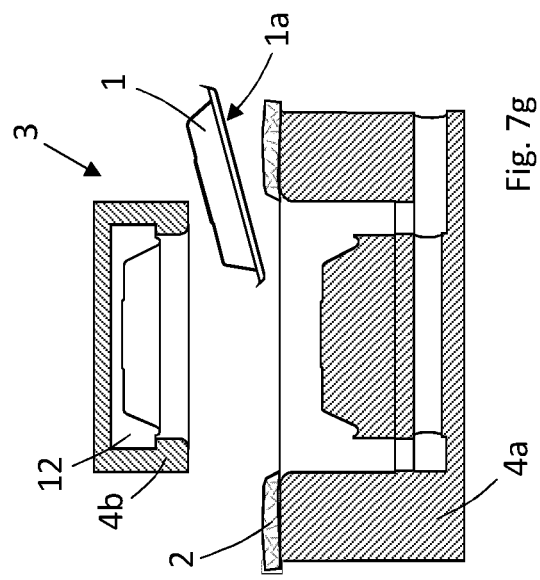
Figure 7F:
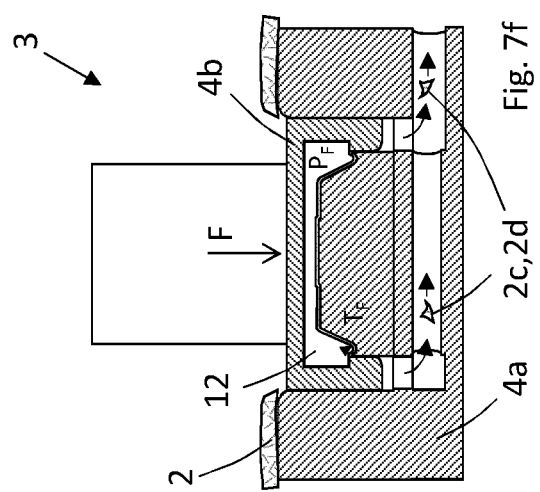
Figure 7E:
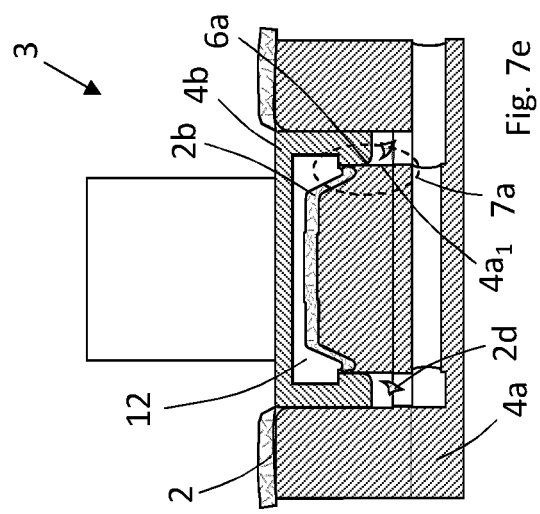

As illustrated in FIG. 7b, the cellulose blank structure 2 is arranged between the first mould part 4a and the second mould part 4b. Thereafter, the second mould part 4b is moved towards the first mould part 4a, as shown in FIG. 7c, and during the movement, the outer tearing arrangement 7b is pre-separating the cellulose blank structure 2 between the second wall surface section $4a_2$ and the third wall surface section $4b_3$. With the pre-separation, the pre-separated cellulose blank structure 2e is formed. Upon further movement of the second mould part 4b towards the first mould part 4a, as shown in FIG. 7d, the tearing of the pre-separated cellulose blank structure 2e in the inner tearing arrangement 7a is initiated, and thereafter the tearing is completed in the inner tearing arrangement 7a, as shown in FIG. 7e. In FIG. 7f, the movement of the second mould part 4b towards the first mould part 4a is completed and the forming temperature $T_F$ and the forming pressure $P_F$ is applied on the cellulose blank structure 2 to finalize the forming of the cellulose product 1. In this step, the residual cellulose 2c in the separated cellulose blank structure 2d can be evacuated with suitable evacuation means. After the forming, the second mould part 2b is moved away from the first mould part 4a, as shown in FIG. 7g, and the cellulose product 1 can be removed from the forming mould system 3. As described above, the first mould part 4a comprises the second wall surface section $4a_2$ arranged outwardly of the first wall surface section $4a_1$, and the second mould part 4b comprises a third wall surface section $4b_3$ arranged outwardly of the inlet opening 6b. The second wall surface section $4a_2$ and the third wall surface section $4b_3$ are forming the outer tearing arrangement 7b. During the tearing, the cellulose blank structure 2 is pre-separated into the pre-separated cellulose blank structure 2e with the outer tearing arrangement 7b between second wall surface section $4a_2$ and the third wall surface section $4b_3$ during movement of the first mould part 4a and/or the second mould part 4b in the pressing direction $D_P$, which movement or movements may depend on the configuration of the forming mould system 3. The pre-separation is taking place before at least partly tearing the pre-separated cellulose blank structure 2e with the inner tearing arrangement 7a.

Similar to the description above, the pre-separation, separation or at least part separation of the cellulose blank structure 2 into a pre-separated cellulose blank structure 2e, cellulose blank structure part 2b and a separated cellulose blank structure 2d takes place before the forming pressing $P_F$ is applied to provide the cellulose product 1 with sides having a smooth surface structure with no edges extending in a direction essentially perpendicular to the pressing direction $D_P$.

In FIG. 8, an alternative embodiment of the outer tearing arrangement 7b is schematically illustrated. In this embodiment, the first mould part 4a and the second mould part 4b are having configurations similar to the ones described in connection to the embodiment illustrated in FIGS. 7a-g. However, the first mould part 4a is arranged without the outer transition surface. Instead of the outer transition surface, the first mould part 4a comprises a mould part edge $4a_E$ arranged in connection to the second wall surface section $4a_2$. The mould part edge $4a_E$ is arranged between the second wall surface section $4a_2$ and an outer mould surface $4a_{OS}$ of the first mould part 4a, as illustrated in FIG. 8. The third wall surface section $4b_3$ of the second mould part 4b comprises a plurality of separating protrusions 15 extending around an outer periphery of the third wall surface section $4b_3$, as schematically indicated in FIG. 8. In the illustrated embodiment, the separating protrusions 15 are having needle-like configurations. However, the separating protrusions may have any suitable shape or configuration, such as for example tooth-like. The separating protrusions 15 are pointing in the pressing direction $D_P$, and the separating protrusions are further extending from the third wall surface section $4b_3$ in the pressing direction $D_P$ beyond the outer mould section $4b_{OS}$ towards the first mould part 4a. A movable holding member 16 is arranged for locking the cellulose blank structure 2 in position in relation to the first mould part 4a during the forming process. The holding member 16 is pushing the cellulose blank structure 2 towards the outer mould surface $4a_{OS}$, and the holding member may be a ring-shaped structural member suitable for holding the cellulose blank structure 2 in position in relation to the first mould part 4a. Before movement of the second mould part 4b towards the first mould part 4a, the holding member 16 is moved into a position where it is securing the cellulose blank structure 2 towards the first mould part 4a. During movement of the second mould part 4b towards the first mould part 4a, the separating protrusions 15 are penetrating the cellulose blank structure 2. The penetration of the cellulose blank structure is further locking the cellulose blank structure 2 in position in relation to the mould parts. During further movement of the second mould part 4b towards the first mould part 4a, the separating protrusions 15 and the third wall surface section $4b_3$ meet the mould part edge $4a_E$ and the second wall surface section $4a_2$. The forming moulds may be arranged with a suitable gap between the second wall surface section $4a_2$ and the third wall surface section $4b_3$ during the forming process for an efficient tearing of the cellulose blank structure 2. The size of the gap may be varied depending on the thickness and configuration of the cellulose blank structure 2. Through the interaction between the separating protrusions 15 and the third wall surface section $4b_3$, and the mould part edge $4a_E$ and the second wall surface section $4a_2$, the cellulose blank structure 2 is being pre-separated through tearing with the outer tearing arrangement 7b. In this embodiment, the forming mould system 3 comprises the same inner tearing arrangement as described in connection to the embodiment shown in FIGS. 7a-g.

For all embodiments, the first mould part 4a and/or the second mould part 4b may comprise a deformation element 12, as schematically illustrated in the figures and briefly discussed above. The deformation element 12 is configured for exerting the forming pressure $P_F$ on the cellulose blank structure 2 in the forming cavity 5a during forming of the cellulose products 1. The deformation element 12 may be attached to the first mould part 4a and/or the second mould part 4b with suitable attachment means, such as for example glue or mechanical fastening members. During the forming of the cellulose products 1, the deformation element 12 is deformed to exert the forming pressure $P_F$ on the cellulose blank structure 2 and through deformation of the deformation element 12, an even pressure distribution is achieved even if the cellulose products 1 are having complex three-dimensional shapes or if the cellulose blank structure 2 is having a varied thickness.

The deformation element 12 is being deformed during the forming process, and the deformation element 12 is during forming of the cellulose products 1 arranged to exert the forming pressure $P_F$ on the cellulose blank structure 2. To exert a required forming pressure $P_F$ on the cellulose blank structure 2, the deformation element 12 is made of a material that can be deformed when a force or pressure is applied, as schematically indicated in FIG. 1c for illustrative purposes, where the deformation element 12 is partly deformed during the forming process. The dotted line in FIG. 1c is illustrating the original shape of the deformation element 12 without any deformation. For example, the deformation element 12 can be made of an elastic material capable of recovering size and shape after deformation. The deformation element 12 may further be made of a material with suitable properties that is withstanding the high forming pressure $P_F$ and forming temperature $T_F$ levels used when forming the cellulose products 1.

During the forming process, the deformation element 12 is deformed to exert the forming pressure $P_F$ on the cellulose blank structure 2. Through the deformation an even pressure distribution can be achieved, even if the cellulose products 1 are having complex three-dimensional shapes with cut-outs, apertures and holes, or if the cellulose blank structure 2 used is having varying density, thickness, or grammage levels.

Certain elastic or deformable materials have fluid-like properties when being exposed to high pressure levels. If the deformation element 12 is made of such a material, an even pressure distribution can be achieved in the forming process, where the pressure exerted on the cellulose blank structure 2 from the deformation element 12 is equal or essentially equal in all directions between the mould parts. When the deformation element 12 during pressure is in its fluid-like state, a uniform fluid-like pressure distribution is achieved. The forming pressure is with such a material thus applied to the cellulose blank structure 2 from all directions, and the deformation element 12 is in this way during the forming of the cellulose products 1 exerting an isostatic forming pressure on the cellulose blank structure 2, as schematically indicated with arrows in FIGS. 1*d* and 3*e* for illustrative purposes. The isostatic forming pressure from the deformation element 12 is establishing a uniform pressure in all desired directions on the cellulose blank structure 2, such as perpendicular to the wall surface of the forming cavity 5*a*. The isostatic forming pressure is providing an efficient forming process of the cellulose products 1, and the cellulose products 1 can be produced with high quality even if having complex shapes. According to the disclosure, when forming the cellulose products, the forming pressure $P_F$ may for all embodiments be an isostatic forming pressure of at least 1 MPa, preferably 4-20 MPa.

The deformation element 12 may be made of a suitable structure of elastomeric material, where the material has the ability to establish a uniform pressure on the cellulose blank structure 2 during the forming process. As an example, the deformation element 12 may be made of a massive structure or an essentially massive structure of silicone rubber, polyurethane, polychloroprene, or rubber with a hardness in the range 20-90 Shore A. Other materials for the deformation element 12 may for example be suitable gel materials, liquid crystal elastomers, and MR fluids.

The deformation element 12 may also be configured as a thin membrane with a fluid that is exerting the forming pressure on the cellulose blank structure 2, or alternatively as a thick membrane with one or more fluid channels inside.

For all embodiments, a side wall section 13 of the deformation element 12 and the transition surface 6*a* may be arranged to form a compacting arrangement 14, as schematically shown in FIG. 1*c* for illustrative purposes. In FIG. 1*c*, the deformation element is attached to the first mould part 4*a*. However, in other embodiments the deformation element 12 may instead be attached to the second mould part 4*b*. The compacting arrangement 14 is configured for compacting the cellulose blank structure 2 between the side wall section 13 and the transition surface 6*a*. The compacting of the cellulose blank structure 2 with the compacting arrangement 14 between the side wall section 13 and the transition surface 6*a* may take place during movement of the first mould part 4*a* and/or the second mould part 4*b* in the pressing direction $D_P$. The compacting of the cellulose blank structure 2 between the deformation element 12 and the transition surface is supporting and facilitating the transportation of the cellulose blank structure 2 into the forming cavity 5*a*. As described above, to exert a required forming pressure $P_F$ on the cellulose blank structure 2, the deformation element 12 is made of a material that can be deformed when a force or pressure is applied, as schematically indicated in FIG. 1*c* for illustrative purposes. In FIG. 1*c*, the deformation element 12 is partly deformed and the dotted line is illustrating the original shape of the deformation element 12. The deformation of the deformation element 12 is exerting a pressure on the cellulose blank structure 2, and the exerted pressure is compacting the cellulose blank structure 2 between the deformation element 12 and the transition surface 6*a*. In the embodiment illustrated in FIG. 1*c*, the side wall section 13 is pushing the cellulose blank structure 2 towards the transition surface 6*a* during the movement of the first mould part 4*a* towards the forming cavity 5*a*. A compacted cellulose blank structure 2 is having a higher tensile strength, due to the closer interaction between the cellulose fibres in the cellulose blank structure 2. The compacted cellulose blank structure 2, thus has an improved breakage resistance when being displaced into the forming cavity 5*a*, and the compacted cellulose blank structure 2 is less prone to break or form cracks during the transport into the forming cavity due to the configuration of the transition surface.

If the deformation element 12 and the transition surface 6*a* are chosen with configurations, where the friction between the deformation element 12 and the cellulose blank structure 2 is higher than the friction between the transition surface 6*a* and the cellulose blank structure 2, the higher friction between the deformation element 12 and the cellulose blank structure 2 is supporting the displacement of the cellulose blank structure 2 into the forming cavity 5*a* during the forming process. By arranging the forming mould system 3 with a friction between the deformation element 12 and the cellulose blank structure 2 that is higher than the friction between the transition surface 6*a* and the cellulose blank structure 2, the displacement of the cellulose blank structure 2 into the forming cavity 5*a* is becoming more efficient. The higher friction between the deformation element 12 and the cellulose blank structure 2 is thus supporting the displacement of the cellulose blank structure 2 into the forming cavity 5*a* and further the shaping of the cellulose blank structure 2 from the first configuration $C_1$ into the second configuration $C_2$. During the displacement of the cellulose blank structure 2, the lower friction between the transition surface 6*a* and the cellulose blank structure 2 secures that the cellulose blank structure 2 easily can slide along the transition surface 6*a* into the forming cavity 5*a*. The lower friction between the transition surface 6*a* and the cellulose blank structure 2, the more efficient displacement of the cellulose blank structure 2 into the forming cavity 5*a*. The transition surface 6*a* may for example be coated with a low-friction material, such as for example PTFE.

In an alternative embodiment, the friction between the deformation element 12 and the cellulose blank structure 2 is the same as, or essentially the same as, the friction between the transition surface 6*a* and the cellulose blank structure 2, which may be suitable for certain applications. In further alternative embodiments, the friction between the deformation element 12 and the cellulose blank structure 2 is lower than the friction between the transition surface 6*a* and the cellulose blank structure 2.

For all embodiments, the inlet section 6 may comprise one or more protrusions 10 extending from the outer mould section $4b_{OS}$ towards the forming cavity 5*a* and/or one or more grooves 11 extending from the outer mould section $4b_{OS}$ towards the forming cavity 5*a*. The one or more protrusions 10 and/or the one or more grooves 11 are configured for controlling or steering the displacement of the cellulose blank structure 2 into the forming cavity 5*a*, and may have any suitable shape and configuration depending on the design of the mould part. In the embodiment shown in FIG. 9*a*, the inlet section 6 of the second mould part 4*b* comprises a plurality of protrusions 10. The protrusions 10 are extending from the outer mould section $4b_{OS}$ towards the forming cavity 5*a*, and as illustrated across the transition surface 6*a*. In the embodiment shown in FIG. 9*b*, the inlet section 6 of the second mould part 4*b* comprises a plurality of grooves 11. The grooves 11 are extending from the outer mould section $4b_{OS}$ towards the forming cavity 5a, and as illustrated across the transition surface 6a. It may be possible to combine protrusions 10 and grooves 11 on the inlet section 6. In the embodiment shown in FIG. 9c, the inlet section 6 of the second mould part 4b comprises a plurality of protrusions 10 and grooves 11 combined into a wave-shaped pattern. The protrusions 10 and the grooves 11 are extending from the outer mould section $4b_{OS}$ towards the forming cavity 5a, and as illustrated across the transition surface 6a.

The forming mould system 3 may further comprise a suitable control unit for controlling the forming of the cellulose products 1. The control unit may comprise, suitable software and hardware for controlling the forming mould system 3, and the different process and method steps performed by the forming mould system 3. The control unit may for example control the temperature, pressure, the forming time, and other process parameters. The control unit may further be connected to related process equipment, such as for example, pressing units, heating units, cellulose blank structure transportation units, and cellulose product transportation units.

It is to be understood that the pre-separation, separation or at least partly separation of the cellulose blank structure 2 into the cellulose blank structure part 2b, separated cellulose blank structure 2d and/or pre-separated cellulose blank structure 2e for the different embodiments of the disclosure may take place before the pressing of the cellulose blank structure part 2b into the cellulose product 1.

The present disclosure has been presented above with reference to specific embodiments. However, other embodiments than the above described are possible and within the scope of the disclosure.

Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the forming mould system, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors arranged on the vehicle surface, an off-site server, or a cloud-based server.

The processor or processors associated with the control unit and the forming mould may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Cellulose product
1a: Edge, Cellulose product
2: Cellulose blank structure
2a: Cellulose blank body
2b: Cellulose blank structure part
2c: Residual cellulose
2d: Separated cellulose blank structure
2e: Pre-separated cellulose blank structure
3: Forming mould system
4a: First mould part
$4a_1$: First wall surface section
$4a_2$: Second wall surface section
$4a_E$: Mould part edge
$4a_{OS}$: Outer mould surface
4b: Second mould part
$4b_3$: Third wall surface section
$4b_{OS}$: Outer mould section
5: Forming cavity section
5a: Forming cavity
5b: Cavity inlet opening
5c: Outer periphery, Forming cavity
6: Inlet section
6a: Transition surface
6b: Inlet opening
6c: Inner periphery, Inlet opening
6d: Outer periphery, Inlet opening
7a: Inner tearing arrangement
7b: Outer tearing arrangement
8a: First surface section
8b: Second surface section
9: Edge forming section
9a: Wall surface
9b: Opening
9c: Inner periphery, Opening
9d: Outer periphery, Opening 10: Protrusion
11: Groove
12: Deformation element
13: Side wall section
14: Compacting arrangement
15: Separating protrusions
16: Holding member
$D_P$: Pressing direction
$P_F$: Forming pressure
$T_F$: Forming temperature
$C_1$: First configuration
$C_2$: Second configuration

The invention claimed is:

1. A forming mould system for forming a cellulose product from an air-formed cellulose blank structure, wherein the forming mould system comprises a first mould part and a second mould part, wherein the first mould part and the second mould part are configured for moving in relation to each other in a pressing direction,
 wherein the second mould part comprises a forming cavity section and an inlet section, wherein the inlet section is arranged in connection to the forming cavity section and configured for facilitating displacement of the cellulose blank structure into a forming cavity of the forming cavity section,
 wherein the inlet section comprises a transition surface defining an inlet opening, wherein the inlet opening is having a tapered configuration towards the forming cavity,
 wherein a first wall surface section of the first mould part and the transition surface are forming an inner tearing arrangement, wherein the inner tearing arrangement is configured for at least partly separating a cellulose blank structure part from the cellulose blank structure between the first wall surface section and the transition surface, or
 wherein a cutting edge arranged in the second mould part is surrounding a cavity inlet opening of the forming cavity section and arranged in connection to the inlet section, and is configured for cutting the cellulose blank structure during displacement of the cellulose blank structure into the forming cavity of the forming cavity section.

2. The forming mould system according to claim 1, wherein the transition surface is extending from an outer mould section of the second mould part towards the cavity inlet opening of the forming cavity.

3. The forming mould system according to claim 1, wherein the first mould part comprises a second wall surface section arranged outwardly of the first wall surface section, wherein the second mould part comprises a third wall surface section arranged outwardly of the inlet opening, wherein the second wall surface section and the third wall surface section are forming an outer tearing arrangement, wherein the outer tearing arrangement is configured for pre-separating the cellulose blank structure between the second wall surface section and the third wall surface section.

4. The forming mould system according to claim 1, wherein the transition surface has a curved tapered configuration.

5. The forming mould system according to claim 2, wherein the transition surface comprises a first surface section extending from the outer mould section in a direction towards the forming cavity, and a second surface section extending from the first surface section in a direction towards the forming cavity.

6. The forming mould system according to claim 5, wherein the first surface section has a curved tapered configuration, and wherein the second surface section has a curved tapered configuration or a frustoconical-like tapered configuration.

7. The forming mould system according to claim 1, wherein the second mould part further comprises an edge forming section configured for pre-shaping the cellulose blank structure part and forming an edge of the cellulose product, wherein the edge forming section is arranged between the inlet section and the forming cavity section.

8. The forming mould system according to claim 7, wherein the edge forming section comprises a wall surface, wherein the wall surface is connecting the inlet section and the forming cavity section, wherein the wall surface is extending in the pressing direction, or essentially in the pressing direction, between the inlet section and the forming cavity section.

9. The forming mould system according to claim 2, wherein the inlet section comprises one or more protrusions extending from the outer mould section towards the forming cavity,
 and/or one or more grooves extending from the outer mould section towards the forming cavity, wherein the one or more protrusions and/or the one or more grooves are configured for controlling the displacement of the cellulose blank structure into the forming cavity.

10. The forming mould system according to claim 1, wherein the inlet section is arranged as an integrated structure of the second mould part.

11. The forming mould system according to claim 1, wherein the first mould part and/or the second mould part comprises a deformation element, wherein the deformation element is configured for exerting a forming pressure on the cellulose blank structure in the forming cavity.

12. The forming mould system according to claim 11, wherein the forming pressure is in the range 1-100 MPa.

13. The forming mould system according to claim 11, wherein the forming pressure is an isostatic forming pressure.

14. The forming mould system according to claim 11, wherein a side wall section of the deformation element and the transition surface are forming a compacting arrangement, wherein the compacting arrangement is configured for compacting the cellulose blank structure between the side wall section and the transition surface.

* * * * *